(12) United States Patent
Witt

(10) Patent No.: US 6,862,638 B2
(45) Date of Patent: *Mar. 1, 2005

(54) RSM-RESIDENT PROGRAM INITIATION SEQUENCE

(75) Inventor: Louis P. Witt, Orlando, FL (US)

(73) Assignee: Columbia Data Products, Inc., Altamonte Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/248,426

(22) Filed: Jan. 19, 2003

(65) Prior Publication Data

US 2004/0128525 A1 Jul. 1, 2004

Related U.S. Application Data

(63) Continuation of application No. PCT/US02/40106, filed on Dec. 16, 2002.

(51) Int. Cl.[7] ............................. G06F 13/00; G06F 9/00
(52) U.S. Cl. ........................... 710/104; 713/2; 713/100
(58) Field of Search ..................................... 710/104, 8

(56) References Cited

U.S. PATENT DOCUMENTS 5,748,596 A    5/1998  Nakamichi
6,125,408 A    9/2000  McGee et al.
6,178,503 B1   1/2001  Madden et al.
6,324,692 B1   11/2001 Fiske

OTHER PUBLICATIONS

Authored by Applicant, "Stipulated Art with Respect to Present Application," 7 pages.

Primary Examiner—Tim Vo
(74) Attorney, Agent, or Firm—Tillman Ivsan, PLLC

(57) ABSTRACT

A user's intention to perform a computer operation is confirmed in order to safeguard against accidental performance of the operation. The operation is initiated only after a user's intention to perform the operation is confirmed. The user's intention is confirmed by replacing within a computer configuration a first removable storage medium with a second removable storage medium. The first removable storage medium is replaced with the second removable storage medium after a program on the first removable storage medium has been read by the computer. The program includes computer-executable instructions for determining the presence or absence within the computer configuration of the second removable storage medium in place of the first removable storage medium. The user's intention is confirmed without requiring the use of a user-input device of a computer.

32 Claims, 11 Drawing Sheets

RSM-RESIDENT PROGRAM INITIATION SEQUENCE

CROSS REFERENCE TO RELATED APPLICATIONS

This patent application is a continuation application claiming priority in the United States under 35 U.S.C. § 120 to the benefit of the filing date of international patent application serial no. PCT/US02/40106, filed designating the United States on Dec. 16, 2002, and titled "Initiation Sequences For Performing Protected Computer Operations" (and to be published in English), which international patent application is incorporated herein by reference. This application also relates to the same field of invention as the current assignee's U.S. patent application Ser. No. 10/248,424, filed Jan. 18, 2003, which is the nonprovisional of provisional U.S. patent application Ser. No. 60/350,434, filed Jan. 22, 2002, both of which are incorporated herein by reference.

BACKGROUND OF INVENTION

It is desirable when a certain operation is to be performed on a computer to require user confirmation for such operation before initiation thereof. By way of example and not limitation, such operations include, for example, operations that are potentially damaging or result in irreversible changes to the computer, such as a low-level disk formatting of the computer's hard drive; restoring the computer to a previous, known state; reinstallation of the operating system of the computer; or performing emergency repair operations on the computer. Additional operations, for example, are set forth and discussed in the "Exemplary Commercial Utilizations" section below.

By confirming an intention of a user to perform an operation on the computer, the operation is "protected" from accidentally being performed. User confirmation is determined by: (1) communicating by the computer a warning to the user through a user-output device associated with the computer; and (2) in response thereto, communicating by the user a signal to the computer through a traditional user-input device associated with the computer. A user-output device includes, for example, a video display monitor, a light, or a speaker and the like. A traditional user-input device includes, for example, a keyboard, a touch screen, a mouse, or a microphone and the like.

Unfortunately, there are circumstances in which a user's intention to perform an operation cannot be confirmed beforehand and, thus, the operation is unprotected from accidental performance. For example, a user's intention to perform an operation cannot be confirmed when there are no traditional user-input and/or user-output devices. A user's intention to perform an operation also cannot be confirmed when user-input and/or user-output devices associated with a computer malfunction or otherwise are disabled. A user's intention to perform an operation also cannot be confirmed when the operation itself must be successfully performed on the computer before the associated user-input and/or user-output devices may even be initialized. Under these circumstances, allowing an operation to be performed on the computer without user confirmation is undesirable but, nevertheless, necessary.

The disadvantages of not being able to confirm a user's intentions to perform an operation are particularly apparent when an operation is to be performed on a "headless server" using a "bootstrap program." In this regard, a "headless server" is a computer that has neither monitor, keyboard, nor mouse and that functions as a server in a computer network. Headless servers are found in common computer networks. A bootstrap program is a program that automatically executes upon booting of a computer.

When an operation is to be performed on a headless server using a bootstrap program, the headless server is booted from auto-running bootstrap media, such as a floppy disk or CD having the bootstrap program, by placing the floppy disk or CD in a drive of the headless server and rebooting it. Using such auto-running bootstrap media, a headless server can be initialized with a base operating system ("O/S") or otherwise restored to an operational condition. Once running, the server then can be configured, for example, by way of a network connected terminal. The headless server then might run unattended for months or years. Unfortunately, if the bootstrap media is inadvertently left in the drive of the headless server (which frequently happens), then, upon reboot months or years later, the operation performed by the auto-running bootstrap program on the headless server automatically restarts contrary to the actual intention of the user. Such an accidental restarting of the bootstrap program (which does not seek to confirm a user's intention to perform again the operation) often indicates deletion of or damage to data and security information on the headless server.

A solution to the "forgotten media" problem is to require a reboot after execution of the operation in order for the headless server to resume normal operations. Leaving the bootstrap media in the drive then will place the computer in an endless loop of repeatedly rebooting and running the protected program until the bootstrap media is removed or otherwise disabled. While certainly not as costly as destroying months or years of data, the requirement of a reboot nonetheless proves wasteful and frustrating when the bootstrap media is inadvertently left in the drive.

In view of the foregoing, a need exists for a system and method for confirming a user's intention to perform a computer operation when there are no traditional user-input and/or user-output devices connected to a computer. A need further exists for system and method for confirming a user's intention to perform a computer operation when user-input and/or user-output devices associated with a computer malfunction, and/or when user-input and/or user-output devices associated with a computer are disabled. A need also exists for a system and method for confirming a user's intention to perform a computer operation when the operation itself must be successfully performed on a computer before the associated user-input and/or user-output devices may even be initialized.

Additionally, a particular need exists for a system and method for confirming a user's intention to perform an operation on a headless computer, especially one that functions as a server in a computer network.

One or more of these needs are met by one or more embodiments of the present invention.

SUMMARY OF INVENTION

The field of the present invention generally relates to performance of computer operations and, in particular, to a system and method for initiating a computer operation only after a user's intention to perform such operation is confirmed.

First Aspect of the Present Invention: RSM-Resident Program Pair Initiation Sequence Briefly described, the present invention broadly relates to a system and method in which a user's intention to perform a computer operation is confirmed. Thus, the present invention guards against a computer operation being inadvertently In accordance with a first aspect of the present invention, a method for protecting against an unintentional computer operation being performed includes the step of initiating the operation only after a user's intention to perform the operation is confirmed. The user's intention is confirmed: (a) by replacing within a computer configuration a first removable storage medium ("RSM") after a first program thereon has been read with a second removable storage medium including thereon a second program, the first program including computer-executable instructions resulting in the reading and running of the second program, and the second program including computer-executable instructions resulting in the initiating of the operation; and (b) without requiring the use of a user-input device of a computer.

In further accordance with this aspect of the present invention, a method for confirming without requiring use of a user-input device a user's intention to perform a computer operation includes the steps of: reading and running a first program stored on a first removable storage medium within a computer configuration; in accordance with the first program, reading and running a second program stored on a second removable storage medium substituted within the computer configuration for the first removable storage medium; and in accordance with the second program, initiating the operation. This method utilizes computer-readable media having computer-executable instructions for performing the steps of this method.

Also in accordance with this aspect of the present invention, in a computer configuration including hardware capable of accessing a particular type of removable storage media only singly, a method for confirming without requiring use of a user-input device of a computer a user's intention to perform a computer operation includes reading and running a first program stored on a first removable storage medium of said type within the computer configuration using the hardware. Furthermore, the method includes reading and running, in accordance with the first program, a second program on a second removable storage medium of said type using the hardware. The method also includes, in turn, initiating the operation in accordance with the second program. The computer configuration also may further include computer-readable media having computer-executable instructions for performing the steps of this method.

A combination in accordance with this aspect of the present invention includes first and second removable storage media, each readable by a computer and collectively having computer-executable instructions for performing a method for initiating a computer operation only after a user's intention to perform the operation is confirmed without requiring use of a user-input device of the computer. The first removable storage medium has computer-executable instructions for reading and running a program on the second removable storage medium, and the second removable storage medium has computer-executable instructions for initiating the operation. Moreover, the computer-executable instructions on the second removable storage medium forms part of the program that is read and run in accordance with the computer-executable instructions on the first removable storage medium. The first removable storage medium may be a bootstrap medium, with the computer-executable instructions forming part of a bootstrap program.

Second Aspect of the Present Invention: RSM-Resident Program Initiation Sequence In accordance with a second aspect of the present invention, a method for protecting against an unintentional computer operation being performed includes the step of initiating the operation only after a user's intention to perform the operation is confirmed. The user's intention is confirmed by replacing within a computer configuration a first removable storage medium with a second removable storage medium. The first removable storage medium is replaced with the second removable storage medium after a program on the first removable storage medium has been read. The program includes computer-executable instructions for determining the presence (i.e., the presence or absence) within the computer configuration of the second removable storage medium in place of the first removable storage medium. The user's intention is confirmed without requiring the use of a user-input device of a computer.

In further accordance with this second aspect of the present invention, a method for confirming without requiring use of a user-input device a user's intention to perform an operation includes the steps of: reading and running a program stored on a first removable storage medium within a computer configuration; in accordance with the program, determining in a check the presence within the computer configuration of a second removable storage medium in place of the first removable storage medium; and initiating the operation only after the check indicates the presence of the second removable storage medium in place of the first removable storage medium. This aspect of the invention also includes computer-readable media having computer-executable instructions for performing the steps of this method.

Also in accordance with this second aspect of the present invention, in a computer configuration including hardware capable of accessing a particular type of removable storage media only singly, a method for confirming without requiring use of a user-input device a user's intention to perform an operation includes: reading and running a program stored on a first removable storage medium of the type within a computer configuration using the hardware; in accordance with the program, accessing a second removable storage medium of the type using the hardware; and initiating the operation only after the second removable storage medium is successfully accessed using the hardware in accordance with the first program. The computer configuration also may further include computer-readable media having computer-executable instructions for performing the steps of this method.

In yet further accordance with this second aspect of the present invention, a first removable storage medium that is readable by a computer has computer-executable instructions for performing a method for initiating an operation only after a user's intention to perform the operation on the computer is confirmed without requiring use of a user-input device of a computer. The method includes the steps of: determining in a check the presence within the computer configuration of a second removable storage medium that has been substituted for the first removable storage medium; and initiating the operation only after the check indicates the presence of the second removable storage medium in place of the first removable storage medium. The first removable storage medium may be a bootstrap medium, with the computer-executable instructions forming part of a bootstrap program.

Third Aspect of the Present Invention: Sequential RSM Presence Initiation Sequence In accordance with a third aspect of the present invention, a method for protecting against an unintentional computer operation being performed includes the step of initiating the operation only after a user's intention to perform the operation is confirmed. The user's intention is confirmed by replacing within a computer configuration a first removable storage medium with a second removable storage medium. Additionally, the user's intention is confirmed without requiring the use of a user-input device of a computer.

In further accordance with this fourth aspect of the present invention, a method for confirming without requiring use of a user-input device a user's intention to perform an operation includes the steps of: determining in a first check the presence within a computer configuration of a first removable storage medium; determining in a second check the presence within the computer configuration of a second storage medium in place of the first removable storage medium; and initiating the operation only after the first check indicates the presence of the first removable storage medium within the computer configuration and the second check indicates the presence of the second removable storage medium within the computer configuration in place of the first removable storage medium. This aspect of the invention also includes computer-readable media having computer-executable instructions for performing the steps of this method.

Also in accordance with this third aspect of the present invention, in a computer configuration including hardware capable of accessing a particular type of removable storage media only singly, a method for confirming without requiring use of a user-input device a user's intention to perform an operation includes accessing the first removable storage medium using the hardware; accessing the second removable storage medium using the hardware; and initiating the operation on the computer only after the first removable storage medium is successfully accessed and the second removable storage medium is successfully accessed. The computer configuration also may further include computer-readable media having computer-executable instructions for performing the steps of this method.

In yet further accordance with this third aspect of the present invention, a first removable storage medium readable by a computer and has computer-executable instructions for performing a method for initiating an operation only after a user's intention to perform the operation is confirmed. Additionally, the user's intention is confirmed without requiring use of a user-input device of a computer. The method further includes the steps of determining in a first check the presence within the computer configuration of the first removable storage medium; determining in a second check the presence of a second removable storage medium in place of the first removable storage medium within the computer configuration; and initiating the operation only after the first check indicates the presence of the first removable storage medium within the computer configuration and the second check indicates the presence of the second removable storage medium in place of the first removable storage medium within the computer configuration. The first removable storage medium may be a bootstrap medium, with the computer-executable instructions forming part of a bootstrap program.

Fourth Aspect of the Present Invention: Bootstrap RSM Removal Initiation Sequence In accordance with a fourth aspect of the present invention, a method for protecting against an unintentional computer operation from being performed includes the step of removing from the computer configuration a removable storage medium (i) after a program on the removable storage medium has been read and (ii) before a check for the continued presence of the removable storage medium within the computer configuration is performed in accordance with the program. Moreover, the user's intention to perform the operation is confirmed without requiring the use of a user-input device of the computer.

In further accordance with this fourth aspect of the present invention, a computerized method for confirming, without requiring use of a user-input device, a user's intention to perform an operation includes the steps of: reading and running a program stored on a removable storage medium within a computer configuration; and in accordance with the first program, (i) determining in a check the continued presence within the computer configuration of the removable storage medium; and (ii) initiating the operation only after the check indicates the absence of the removable storage medium within the computer configuration. This aspect of the invention also includes computer-readable media having computer-executable instructions for performing the steps of this computerized method.

Also in accordance with this fourth aspect of the present invention, in a computer configuration including hardware, a computerized method for confirming, without requiring use of a user-input device, a user's intention to perform an operation includes: reading and running a program on a removable storage medium using the hardware in a first step; and in accordance with the first program, (i) accessing the removable storage medium using the hardware in a second step, and (ii) initiating the operation only after unsuccessful access to the removable storage medium using the hardware in the second step. The computer configuration also may further include computer-readable media having computer-executable instructions for performing the steps of this computerized method.

In yet further accordance with this fourth aspect of the present invention, a removable storage medium readable by a computer has computer-executable instructions for performing a method for initiating an operation only after a user's intention to perform the operation is confirmed without requiring use of a user-input device. The method includes the steps of: determining in a check the continued presence within the computer configuration of the removable storage medium within the computer configuration; and initiating the operation only after the check indicates the absence of the removable storage medium within the computer configuration. The first removable storage medium may be a bootstrap medium, with the computer-executable instructions forming part of a bootstrap program.

Fifth Aspect of the Present Invention: RSM Removal Initiation Sequence

In accordance with a fifth aspect of the present invention, a method for protecting against an unintentional operation being performed includes the step of initiating the operation only after a user's intention to perform the operation is confirmed. The user's intention is confirmed by removing from the computer configuration a removable storage medium (i) after a check for the presence of the removable storage medium within the computer configuration is performed and (ii) before a check for the continued presence of the removable storage medium within the computer configuration is performed. The user's intention is confirmed without requiring the use of a user-input device of a computer.

In further accordance with this fifth aspect of the present invention, a computerized method for confirming, without requiring use of a user-input device, a user's intention to perform an operation includes the steps of: determining in a first check the presence within a computer configuration of a removable storage medium; determining in a second check the continued presence within the computer configuration of the removable storage medium; and initiating the operation only after the first check indicates the presence of the removable storage medium within the computer configuration and the second check indicates the absence of the removable storage medium within the computer configuration. This aspect of the invention also includes computer-readable media having computer-executable instructions for performing the steps of this computerized method.

Also in accordance with this fifth aspect of the present invention, in a computer configuration including a computer and hardware capable of accessing removable storage media, a computerized method for confirming without requiring use of a user-input device a user's intention to perform an operation includes: accessing a removable storage medium using the hardware in a first step; subsequently accessing the removable storage medium using the hardware in a second step; and initiating the operation only after the removable storage medium is successfully accessed in the first step but is unsuccessfully accessed in the second step. The computer configuration also may further include computer-readable media having computer-executable instructions for performing the steps of this computerized method.

In yet further accordance with this fifth aspect of the present invention, a removable storage medium readable by a computer has computer-executable instructions for performing a method for initiating an operation only after a user's intention to perform the operation on the computer is confirmed without requiring use of a user-input device. The method includes the steps of: determining in a first check the presence within the computer configuration of the removable storage medium; determining in a second check the continued presence within the computer configuration of the removable storage medium; and initiating the operation only after the first check indicates the presence of the first removable storage medium within the computer configuration and the second check indicates the absence of the first removable storage medium within the computer configuration. In this aspect of the present invention, the first removable storage medium may be a bootstrap medium, with the computer-executable instructions forming part of a bootstrap program.

Sixth Aspect of the Present Invention: Combined RSM State-Change Initiation Sequence In accordance with a sixth aspect of the present invention, a method for protecting against an unintentional computer operation being performed includes the step of initiating the operation only after a user's intention to perform the operation is confirmed. The user's intention is confirmed by changing within the computer configuration the combined presence of a first removable storage medium and a second removable storage medium. The user's intention is confirmed without requiring the use of a user-input device of a computer.

In further accordance with this sixth aspect of the present invention, a computerized method for confirming, without requiring use of a user-input device, a user's intention to perform an operation includes the steps of: determining in a first check the state of the combined presence within a computer configuration of first and second removable storage media; determining in a second check the state of the combined presence within the computer configuration of the first and second removable storage media; and initiating the operation only after the first and second checks result in a state change. The step of initiating the operation is performed when the first check indicates the combined presence of the removable storage media within the computer configuration and the second check indicates the absence of one of or both removable storage media or, alternatively, the step of initiating the operation is performed when the first check indicates the absence of one of or both removable storage media within the computer configuration and the second check indicates the combined presence of both removable storage media. This aspect of the invention also includes computer-readable media having computer-executable instructions for performing the steps of this computerized method.

Also in accordance with this sixth aspect of the present invention, in a computer configuration including hardware capable of accessing in parallel first and second removable storage media, a computerized method for confirming, without requiring use of a user-input device, a user's intention to perform a computer operation includes: accessing in a first step both the first and second removable storage medium using the hardware; accessing in a second step both the first and second removable storage medium using the hardware; and initiating the operation on the computer only after accessing both media in one of the first and second steps is successful and accessing both media in the other of the first and second steps is unsuccessful. The computer configuration also may further include computer-readable media having computer-executable instructions for performing the steps of this computerized method.

In yet further accordance with this sixth aspect of the present invention, a first removable storage medium readable by a computer has computer-executable instructions for performing a method for initiating a computer operation only after a user's intention to perform the operation is confirmed without requiring use of a user-input device of a computer. The method includes the steps of: determining in a first check the combined presence within the computer configuration of both the first and second removable storage media; determining in a second check the combined presence within the computer configuration of both the first and second removable storage media; and initiating the operation only after the first and second checks indicate a state change. The step of initiating the operation is performed when the first check indicates the combined presence of the removable storage media within the computer configuration and the second check indicates the absence of one of or both removable storage media or, alternatively, the step of initiating the operation is performed when the first check indicates the absence of one of or both removable storage media within the computer configuration and the second check indicates the combined presence of both removable storage media. In this aspect of the present invention, the first removable storage medium may be a bootstrap medium, with the computer-executable instructions forming part of a bootstrap program.

These aspects and features and other aspects and features of the present invention will be more readily understood and apparent upon consideration of the attached drawings and of the following detailed description of those drawings and the presently preferred embodiments of the invention.

BRIEF DESCRIPTION OF DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION

As a preliminary matter, it will readily be understood by those persons skilled in the art that the present invention is susceptible of broad utility and application in view of the following detailed description of preferred embodiments of the present invention. Many devices, methods, embodiments, and adaptations of the present invention other than those herein described, as well as many variations, modifications, and equivalent arrangements thereof, will be apparent from or reasonably suggested by the present invention and the following detailed description thereof, without departing from the substance or scope of the present invention. Accordingly, while the present invention is described herein in detail in relation to preferred embodiments, it is to be understood that this disclosure is illustrative and exemplary and is made merely for purposes of providing a full and enabling disclosure of preferred embodiments of the invention. The disclosure herein is not intended nor is to be construed to limit the present invention or otherwise to exclude any such other embodiments, adaptations, variations, modifications and equivalent arrangements, the present invention being limited only by the claims appended hereto and the equivalents thereof.

A First Preferred Computer Configuration

Figure 1:
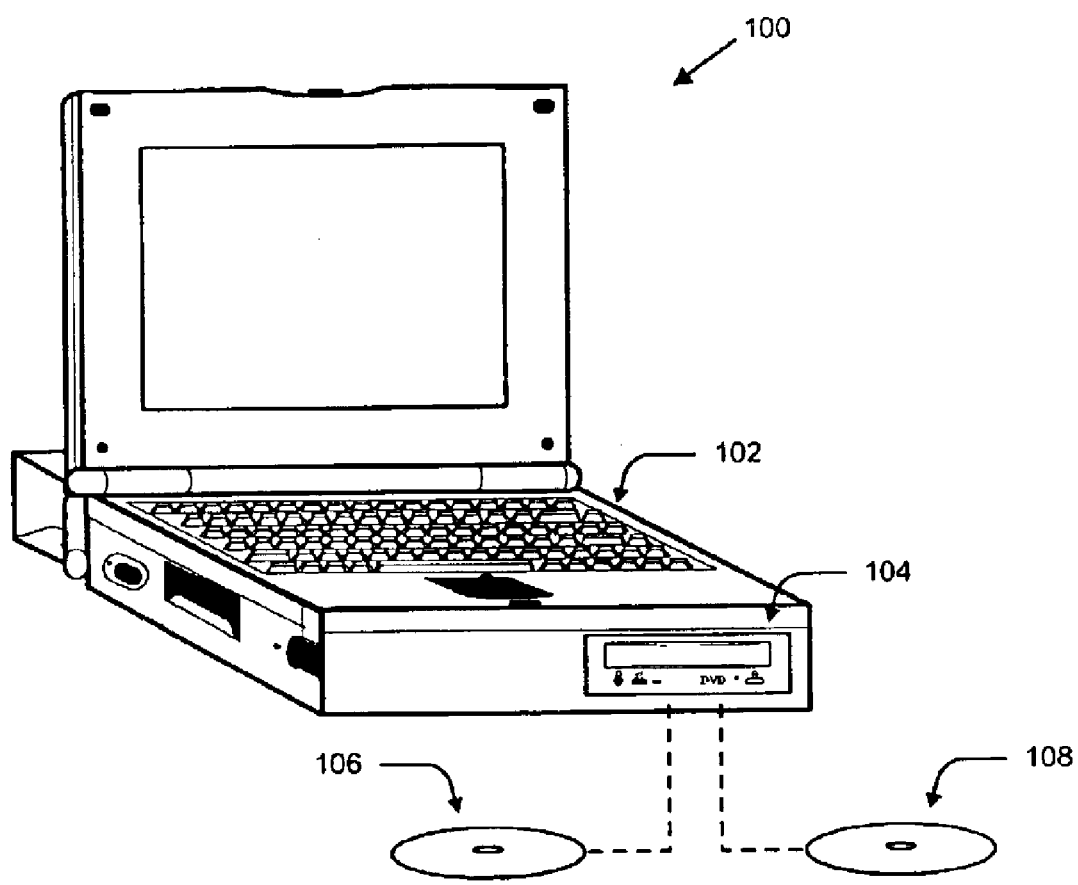
FIG. 1 illustrates a first preferred embodiment of a digital computer configuration of the invention.

Referring to FIG. 1, a first preferred computer configuration 100 is shown in accordance with the present invention. The computer configuration 100 includes a digital computer 102 illustrated as a laptop computer and hardware 104 comprising a DVD drive. Removable storage media 106,108 are illustrated as first and second DVD or CD-ROM disks. These disks are insertable into the DVD drive of the computer configuration 100 for reading thereof by the computer 102.

The computer configuration 100 includes computer-executable instructions for performing at least one of the preferred methods of the present invention, which are described in detail below. In accordance with one or more of the preferred methods described below, the computer-executable instructions are included on one or more computer-readable medium, such as a DVD or CD-ROM disk. Furthermore, in accordance with one or more of the preferred methods described below, at least one of the removable storage media includes a bootstrap program for booting of the laptop computer.

A Second Preferred Computer Configuration

Figure 2:
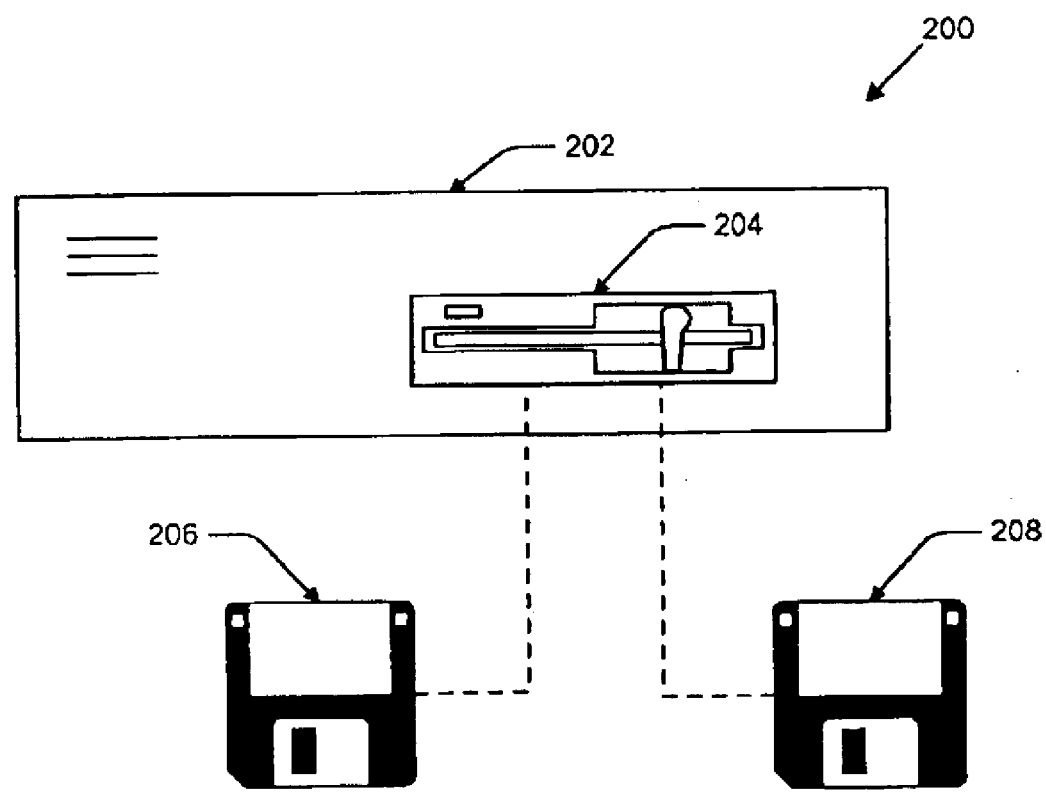
FIG. 2 illustrates a second preferred embodiment of a digital computer configuration of the invention.

A second preferred computer configuration 200 is shown in FIG. 2 in accordance with the present invention. Similar to the computer configuration 100 of FIG. 1, the computer configuration 200 of FIG. 2 includes a digital computer 202 having hardware 204 in which first and second removable media 206,208 are insertable for reading by the computer 202. Unlike the computer configuration 100 of FIG. 1, the computer 202 is illustrated as a headless server, as the computer configuration 200 includes no user-input or output devices; the hardware 204 comprises a floppy drive; and the removable storage media 206,208 comprise floppy disks.

The computer configuration 200 includes computer-executable instructions for performing at least one of the preferred methods of the present invention, which are described in detail below. In accordance with one or more of the preferred methods described below, the computer-executable instructions are included on one or more computer-readable medium, such as a floppy disk. Furthermore, in accordance with one or more of the preferred methods described below, at least one of the removable storage media includes a bootstrap program for booting of the headless server.

A Third Preferred Computer Configuration

Figure 3:
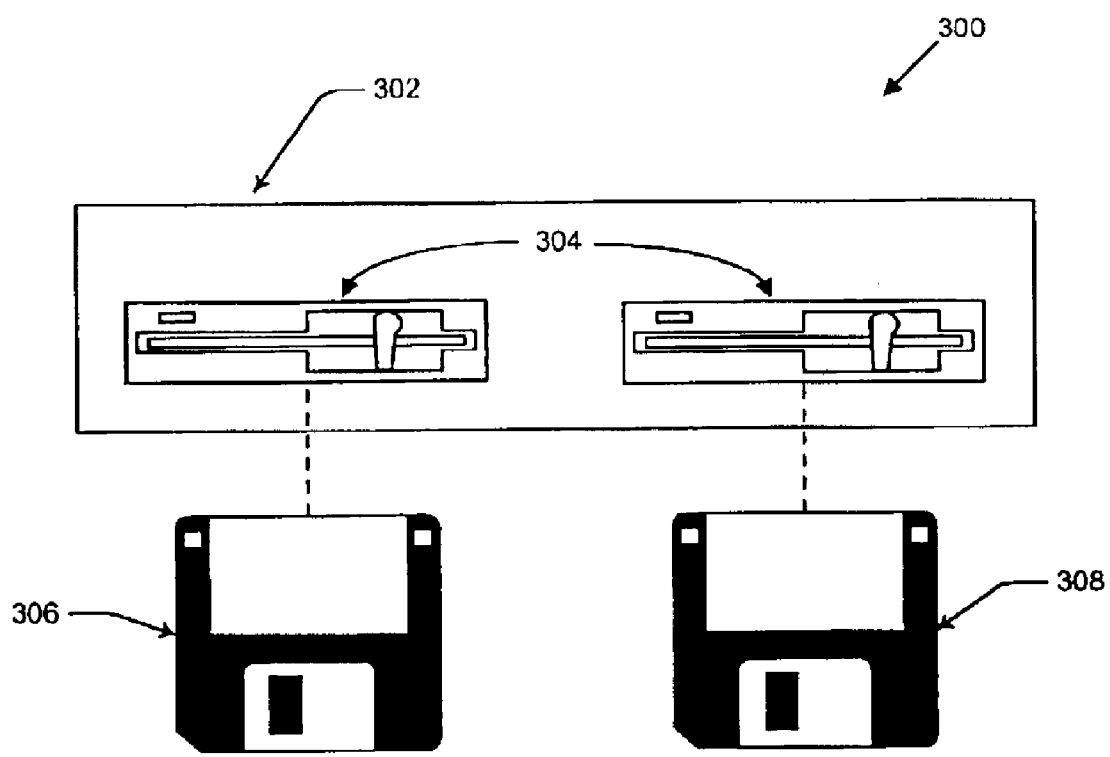
FIG. 3 illustrates a third preferred embodiment of a digital computer configuration of the invention.

A third preferred computer configuration 300 is shown in FIG. 3 in accordance with the present invention. Similar to the aforementioned computer configuration 100,200, the computer configuration 300 includes a digital computer 302 having hardware 304 in which first and second removable media 306,308 are insertable for reading by the computer 302. Further like the computer configuration 200, the computer configuration 300 also includes a headless server as the digital computer 302, as the computer configuration 300 includes no user-input or output devices. The removable storage media 306,308 also comprise floppy disks. However, unlike the computer configurations 200 illustrated in FIG. 2, the hardware 304 includes two floppy drives each capable of reading the removable storage media 306,308.

The computer configuration 300 includes computer-executable instructions for performing at least one of the preferred methods of the present invention, which are described in detail below. In accordance with one or more of the preferred methods described below, the computer-executable instructions are included on one or more computer-readable medium, such as a floppy disk. Furthermore, in accordance with one or more of the preferred methods described below, at least one of the removable storage media includes a bootstrap program for booting of the headless server.

A Fourth Preferred Computer Configuration

Figure 4:
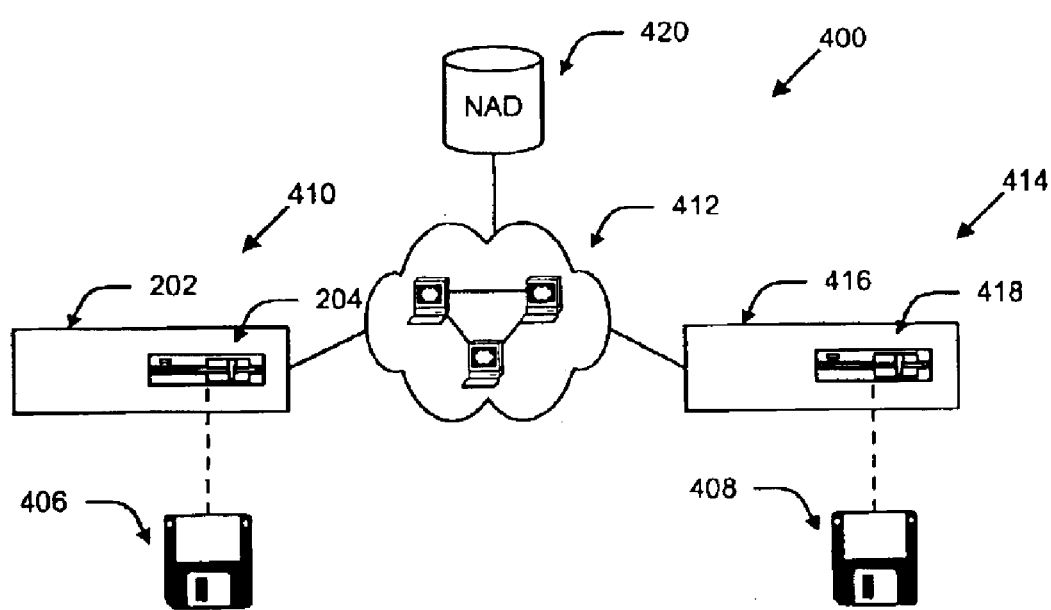
FIG. 4 illustrates a fourth preferred embodiment of a digital computer configuration of the invention.

A fourth preferred computer configuration 400 is shown in FIG. 4 in accordance with the present invention and includes a computer network 412. The computer configuration 200 of FIG. 2 forms part of the computer configuration 400 illustrated in FIG. 4, as the computer configuration 200 represents a node 410 of the computer network 412. The computer configuration 200 includes the digital computer 202 and hardware 204 in which first and second removable storage media 406,408 are insertable for reading by the computer 202. Another node 414 of the computer network 412 includes a second digital computer 416 having hardware 418 for reading of the removable storage media 406,408. The computer network 412 also may include a network attached device (NAD) 420 from which a computer program may be centrally executed for selective performance of an operation on digital computers 202,416.

The computer configuration 400 includes computer-executable instructions for performing at least one of the preferred methods of the present invention, which are described in detail below. In accordance with one or more of the preferred methods described below, the computer-executable instructions are included on one or more computer-readable medium, such as a floppy disk or a hard disk. For example, in accordance with one or more of the preferred methods described below, a hard disk of a NAD may include computer-executable instructions for performing a preferred method.

A First Preferred Method

Figure 5:
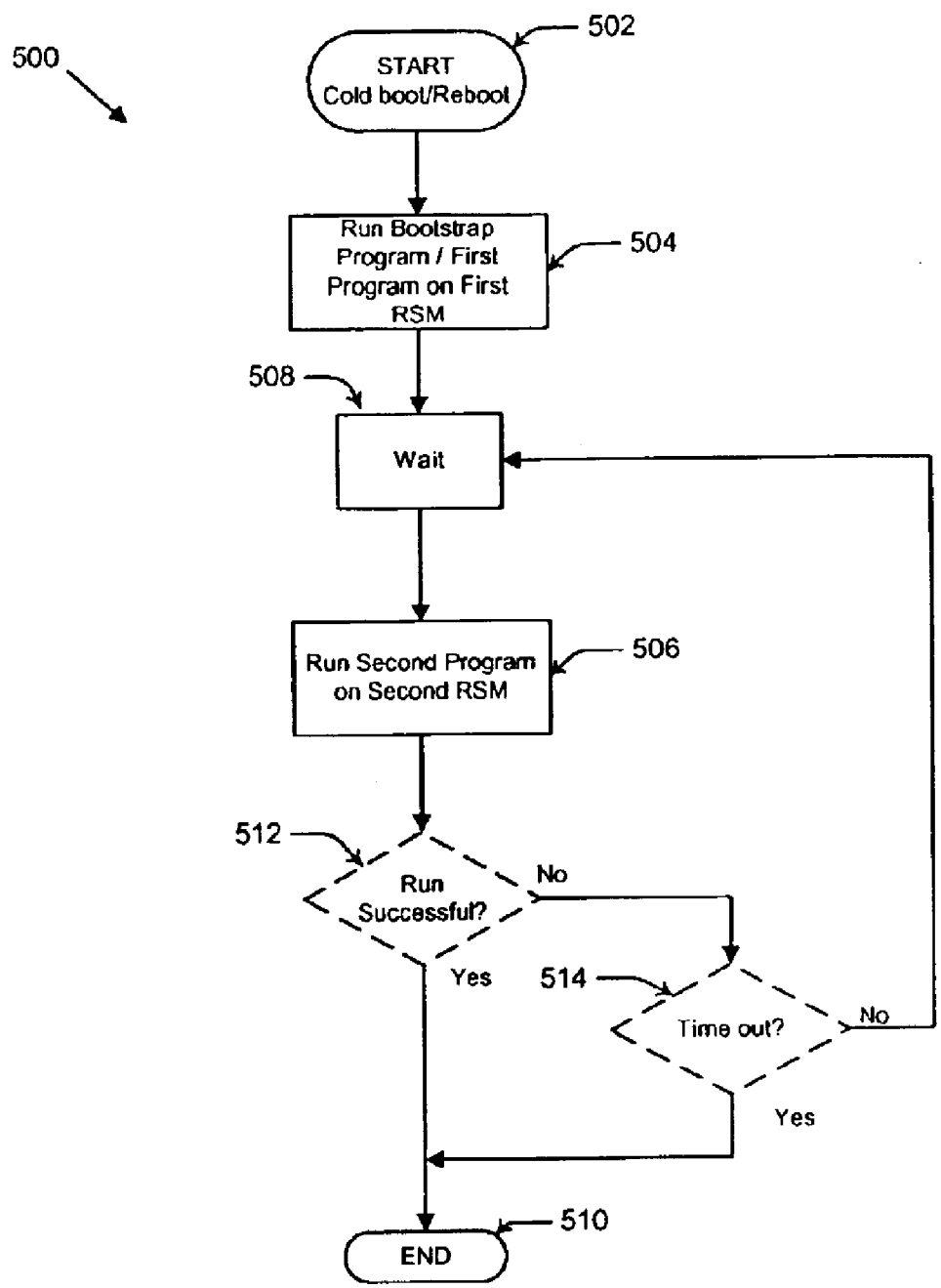
FIG. 5 illustrates a flow diagram of steps of a first preferred embodiment of a method of the invention.

Referring now to FIG. 5, steps of a first preferred method 500 in accordance with the present invention are illustrated. The preferred method 500 begins (Step 502) with a cold boot or reboot of a digital computer, such as, for example, any of the digital computers 102,202 of FIGS. 1–2. During boot-up, the computer generally boots by reading bootstrap storage medium specified in its BIOS settings, which may include, for example, reading from a hard drive, a floppy drive, a CD-ROM or DVD drive, a ZIP drive, or any sequence thereof.

In accordance with the first preferred method 500, a "first" removable storage medium ("RSM") is included in the computer configuration, such as, for example, any of removable storage media 106,206, and the first RSM includes a "first" program that is run (Step 504) during boot-up. Preferably the BIOS settings of the computer causes the computer to attempt to boot first from hardware; the first RSM is a bootstrap storage medium inserted into such hardware; and the first program itself comprises the bootstrap program from which the computer boots. Thus, for example, in the computer configuration 100 of FIG. 1, the first program preferably comprises a bootstrap program on the first DVD or CD-ROM disk from which the laptop computer boots, and in the computer configuration 200 of FIG. 2, the first program preferably comprises a bootstrap program on the first floppy disk from which the headless boots. Alternatively, if the first program is not a bootstrap program, then in this case the bootstrap program-whether residing on the first RSM or elsewhere-preferably instructs the computer to run the first program residing on the first RSM.

In either case, when run the first program instructs the computer to run (Step 506) a "second" program that is found on a "second" RSM, such as, for example, any of removable storage media 108,208. If the computer is unable to read from the second RSM at the appropriate time in order to run the second program (for example, either because the second disk is not in the drive or because the disk is not the second disk and does not actually include the second program), then the second program is not successfully run.

On the other hand, if the computer is able to read the second program on the second RSM, then the second program is successfully run. Successful running of the second program initiates the operation on the computer and, in accordance with this preferred method of the present invention, the second program must be successfully run in order to initiate the operation.

In order to enable a user to replace the first RSM with the second RSM after the first program is read from the first RSM (reading of the first program from the first RSM being required in order to run the first program), a sufficient period of time exists between the reading of the first program from the first RSM and the running of the second program on the second RSM. In this respect, the first program preferably instructs the computer to wait (Step 508) for a period that begins after the first program is read from the first RSM and ends before an attempt is made to run the second program. Accordingly, a user observing the reading of the first RSM followed by the cessation of activity then will have sufficient time in which to switch out the first RSM for the second RSM before an attempt is made to run the second program on the second RSM.

In accordance with the first preferred method, without successfully running the second program on the second RSM, the operation on the computer will not be initiated. Running of the second program that is located on the second RSM is a prerequisite to initiation of the operation on the computer in accordance with this preferred embodiment of the present invention.

Following the attempt to run the second program, whether successful or not, the preferred method then ends (Step 510).

In a variation of the first preferred method as shown in dashed lines in FIG. 5, additional attempts to run the second program may also be made in accordance with the present invention. In this regard, the computer may repeat, for a predetermined number of times and/or for a predetermined time period of time, additional attempts to run successfully the second program on the second RSM before timing out. Under this optional scenario, a determination is made (Step 512) whether the attempt to run the second program on the second RSM was successful. If unsuccessful, then a determination is made whether the predetermined number of attempts has been reached and/or whether the predetermined period of time has expired. If the predetermined number of attempts has not been reached and/or the predetermined period of time has not expired, then the computer again waits (Step 508) and then runs (Step 506) the second program on the second RSM. If the predetermined number of attempts has been reached and/or the predetermined period of time has expired, then the preferred method ends (Step 510) with no further attempts to run the second program on the second RSM.

In view of the foregoing detailed disclosure, it will be apparent that the first preferred method 500 of the present invention represents an initiation sequence that must be successfully performed before initiation of an operation on the computer. The operation is thereby protected from accidental initiation because a user's intention to perform the operation is confirmed by the physical exchange of the removable media within the computer configuration.

It will further be apparent that in accordance with this preferred method 500, a user's intention to perform the operation is confirmed without requiring the use of user-input and user-output devices. No keyboard, mouse, monitor, microphone, speaker, touch screen, or the like is required in order to perform the initiation sequence of the operation. Nor is an on-screen user prompt required in order to confirm the user's intention to perform the operation on the computer. The physical substitution of the second RSM for the first RSM in the computer configuration is a physical act that necessarily must be performed by a user at that time and represents confirmation of the user's intentions to initiate and perform the operation on the computer at that time.

A Second Preferred Method

Figure 6:
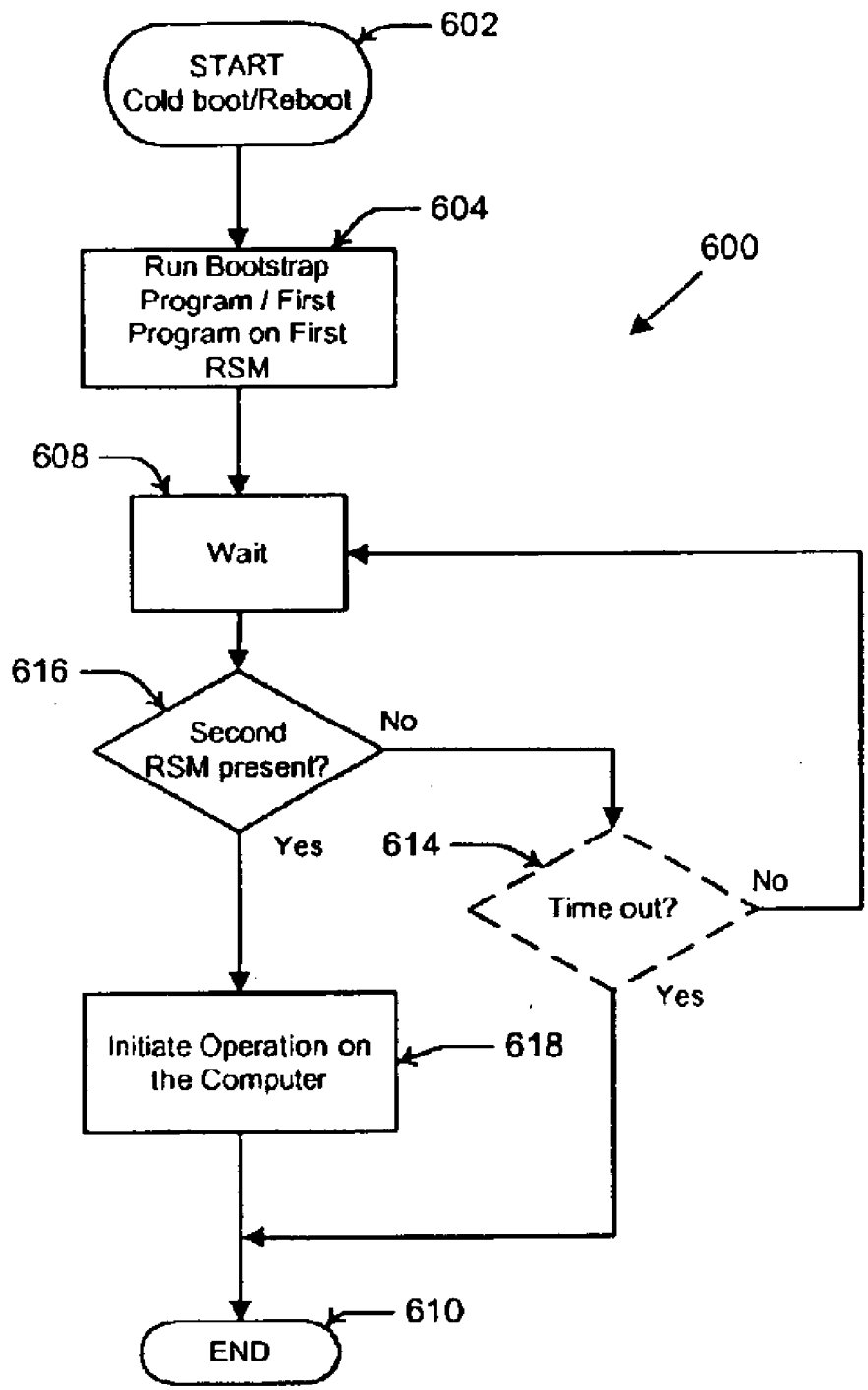
FIG. 6 illustrates a flow diagram of steps of a second preferred embodiment of a method of the invention.

Referring now to FIG. 6, steps of a second preferred method 600 in accordance with the present invention are illustrated. The preferred method 600 begins (Step 602) with a cold boot or reboot of a digital computer, such as, for example, any of the digital computers 102,202 of FIGS. 1–2. During boot-up, the computer generally boots by reading bootstrap storage medium specified in its BIOS settings, which may include, for example, reading from a hard drive, a floppy drive, a CD-ROM or DVD drive, a ZIP drive, or any sequence thereof.

In accordance with the second preferred method 600, a "first" RSM is included in the computer configuration, such as, for example, any of removable storage media 106,206, and the first RSM includes a "first" program that is run (Step 604) by the computer during boot-up. Preferably the BIOS settings of the computer causes the computer to attempt to boot first from, for example, hardware; the first RSM is a bootstrap storage medium inserted into such hardware; and the first program itself comprises the bootstrap program from which the computer boots. Thus, for example, in the computer configuration 100 of FIG. 1, the first program preferably comprises a bootstrap program on the first DVD or CD-ROM disk from which the laptop computer boots, and in the computer configuration 200 of FIG. 2, the first program preferably comprises a bootstrap program on the first floppy disk from which the headless boots. Alternatively, if the first program is not a bootstrap program, then in this case the bootstrap program-whether residing on the first RSM or elsewhere-preferably instructs the computer to run the first program on the first RSM.

In either case, the first program instructs the computer to determine (Step 616) whether a "second" RSM, such as, for example, any of removable storage media 108,208, is present within the computer configuration. Thus, for example, in the computer configuration 100 of FIG. 1, the computer determines whether the second DVD or CD-ROM disk is present in the DVD drive. In the computer configuration 200 of FIG. 2, the computer determines whether the second floppy disk is present in the floppy drive.

Generally, the presence of the second RSM is determined by attempting to access a directory or file known to exist on the second RSM. Such access includes reading from the second RSM and/or writing to the second RSM, including the running of a program on the second RSM. If access is successful, then the second RSM is determined to be present. Thus, for example, the presence of the second DVD or CD-ROM disk preferably is determined in the computer configuration 100 of FIG. 1, for example, by checking the drive for a known identifier of the second disk, such as a disk serial number. The presence of the second floppy disk preferably is determined in the computer configuration 200 of FIG. 2, for example, by checking the floppy drive for a known identifier of the second floppy disk, such as a disk serial number.

If the second RSM is determined not to be present within the computer configuration, then the operation on the computer is not initiated and this preferred method ends (Step 610). Preferably, this preferred method 600 will have to be started again in order to initiate the operation on the computer. If the second RSM is determined to be present within the computer configuration, then the operation on the computer is initiated (Step 618) and this preferred method ends (Step 610).

In order to enable a user to replace the first RSM with the second RSM after the first program is read from the first RSM, a sufficient period of time exists between the reading of the first program from the first RSM and the check for the presence of the second RSM. In this respect, the first program preferably instructs the computer to wait (Step 608) for a period that begins after the first program is read from the first RSM and ends before a check is made for the second RSM. Accordingly, a user observing the reading of the first RSM followed by the cessation of activity then will have sufficient time in which to substitute the second RSM for the first RSM before the check is made for the presence of the second RSM within the computer configuration.

In accordance with the second preferred method, without successfully determining the presence of the second RSM within the computer configuration in Step 616, the operation on the computer will not be initiated. The presence of the second RSM is a prerequisite to initiation of the operation on the computer in accordance with this preferred embodiment of the present invention.

In a variation of the second preferred method 600 as shown in dashed lines in FIG. 6, additional attempts to check for the presence of the second RSM also may be made in accordance with the present invention. In this regard, the computer may repeat, for a predetermined number of times and/or for a predetermined period of time, additional attempts to determine the presence of the second RSM within the computer configuration. Under this optional scenario, a determination is made (Step 614) whether the predetermined number of attempts to determine the presence of the second RSM has been reached and/or whether the predetermined time period has expired. If the predetermined number of attempts has not been reached and/or the predetermined time period has not expired, then the computer again waits (Step 608) and then determines (Step 616) the presence of the second RSM within the computer configuration. If the predetermined number of attempts has been reached and/or the predetermined time period has expired, then the preferred method ends (Step 610) with no further attempts to determine in Step 616 the presence of the second RSM and without initiation of the operation in Step 618.

In view of the foregoing detailed disclosure, it will be apparent that the second preferred method 600 of the present invention represents an initiation sequence that must be successfully performed before initiation of an operation on the computer. The operation is thereby protected from accidental initiation because a user's intention to perform the operation is confirmed by the physical exchange of the removable media within the computer configuration.

It will further be apparent that in accordance with this preferred method 600, a user's intention to perform the operation is confirmed without requiring the use of user-input and user-output devices. No keyboard, mouse, monitor, microphone, speaker, touch screen, or the like is required in order to perform the initiation sequence of the operation. Nor is an on-screen user prompt required in order to confirm the user's intention to perform the operation on the computer. The physical substitution of the second RSM for the first RSM in the computer configuration is a physical act that necessarily must be performed by a user at that time and represents confirmation of the user's intentions to initiate and perform the operation on the computer at that time.

A Third Preferred Method

Figure 7:
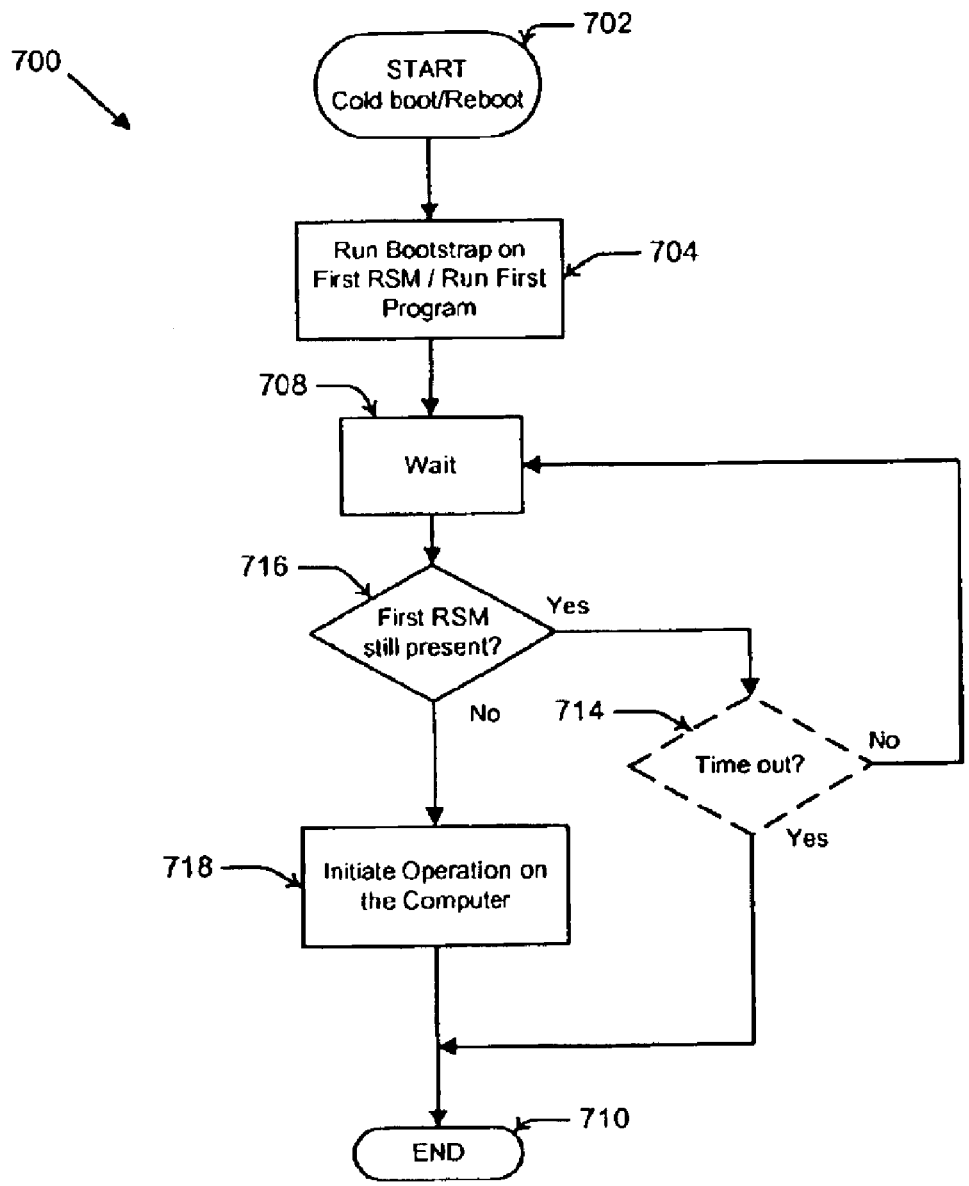
FIG. 7 illustrates a flow diagram of steps of a third preferred embodiment of a method of the invention.

Referring now to FIG. 7, steps of a third preferred method 700 in accordance with the present invention are illustrated. It should be noted that for the third preferred method 700, only a single RSM is required.

The third preferred method 700 begins (Step 702) with a cold boot or reboot of a digital computer, such as, for example, any of the digital computers 102,202 of FIGS. 1–2. During boot-up, the computer generally boots by reading storage medium specified in its BIOS settings, which may include, for example, reading from a hard drive, a floppy drive, a CD-ROM or DVD drive, a ZIP drive, or any sequence thereof.

In accordance with the third preferred method 700, a RSM is included in the computer configuration, such as, for example, any of removable storage media 106,206, and this RSM comprises a bootstrap medium including a bootstrap program from which the computer boots. A "first" program is run (Step 704) by the computer during boot-up and, preferably, the bootstrap program itself comprises the first program.

Accordingly, the BIOS settings of the computer causes the computer to attempt to boot first from hardware containing the RSM. Thus, for example, in the computer configuration 100 of FIG. 1, the first program preferably comprises a bootstrap program on the DVD or CD-ROM disk from which the laptop computer boots, and in the computer configuration 200 of FIG. 2, the first program preferably comprises a bootstrap program on the floppy disk from which the headless server boots. Alternatively, if the first program is not the bootstrap program, then the bootstrap program (which resides on the RSM in accordance with this preferred method) instructs the computer to run the first program, which also resides on the RSM.

When run, the first program instructs the computer to determine (Step 716) whether the RSM continues to be present within the computer configuration. For example, in the computer configuration 100 of FIG. 1, the computer determines whether the DVD or CD-ROM disk remains in the DVD drive following boot-up. In the computer configuration 200 of FIG. 2, the computer determines whether the floppy disk remains in the floppy drive following boot-up.

Generally, the continued presence of the RSM is determined by attempting to access a directory or file known to exist on the RSM. Such access includes reading from the RSM and/or writing to the RSM, including the running of a program on the RSM. If access is successful, then the RSM is determined to remain present. Thus, for example, the continued presence of the DVD or CD-ROM disk preferably is determined in the computer configuration 100 of FIG. 1, for example, by checking the drive for a known identifier of the disk. The continued presence of the floppy disk preferably is determined in the computer configuration 200 of FIG. 2, for example, by checking the floppy drive for a known identifier of the floppy disk.

If the RSM is determined to remain within the computer configuration following boot-up, then the operation on the computer is not initiated and this preferred method ends (Step 710). Preferably, if the preferred method 700 ends at Step 710, then the preferred method 700 will have to be started again in order to initiate the operation on the computer. On the other hand, if the RSM is determined no longer to be present within the computer configuration following boot-up, then the operation on the computer is initiated (Step 718) and this preferred method then ends (Step 710).

In order to enable a user to remove the RSM after the first program is read from the RSM, a sufficient period of time exists between the reading of the first program from the RSM and the check for the continued presence of the RSM. In this respect, the first program preferably instructs the computer to wait (Step 708) for a period that begins after the first program runs and ends before a check is made for the continued presence of the RSM. Accordingly, a user observing the reading of the RSM followed the cessation of activity then will have sufficient time in which to remove the RSM before the check is made for the continued presence of the RSM within the computer configuration.

In accordance with the third preferred method 700, without successfully determining the absence of the RSM within the computer configuration following boot-up (for which the RSM must have been present within the computer configuration), the operation on the computer will not be initiated. The absence of the RSM is a prerequisite to initiation of the operation on the computer. If the preferred method ends at Step 710, then the preferred method will have to be started again in order to initiate the operation on the computer in accordance with this preferred embodiment of the present invention.

In a variation of the third preferred method 700 as shown in dashed lines in FIG. 7, additional attempts to check for the continued presence of the RSM may also be made in accordance with the present invention. In this regard, the computer may repeat, for a predetermined number of times and/or for a predetermined period of time, additional attempts to determine the continued presence of the RSM within the computer configuration. Under this optional scenario, a determination is made (Step 714) whether the predetermined number of attempts to determine the continued presence of the RSM has been reached and/or whether the predetermined time period has expired. If the predetermined number of attempts has not been reached and/or the predetermined period of time has not expired, then the computer again waits (Step 708) and then determines (Step 716) the continued presence of the RSM within the computer configuration. If the predetermined number of attempts has been reached and/or the predetermined time period has expired, then the preferred method ends (Step 710) with no further attempts to determine the continued presence of the RSM within the computer configuration.

In view of the foregoing detailed disclosure, it will be apparent that the third preferred method 700 of the present invention represents an initiation sequence that must be successfully performed before initiation of an operation on the computer. The operation is thereby protected from accidental initiation because a user's intention to perform the operation is confirmed by the physical removal by the user of the RSM, which must necessarily have been present.

It will further be apparent that in accordance with this preferred method 700, a user's intention to perform the operation is confirmed without requiring the use of user-input and user-output devices. No keyboard, mouse, monitor, microphone, speaker, touch screen, or the like is required in order to perform the initiation sequence of the operation. Nor is an on-screen user prompt required in order to confirm the user's intention to perform the operation on the computer. The physical removal of the RSM following its required presence within the computer configuration for booting of the computer is an act that necessarily must be performed by a user at that time and represents confirmation of the user's intentions to initiate and perform the operation on the computer at that time.

A Fourth Preferred Method

Figure 8:
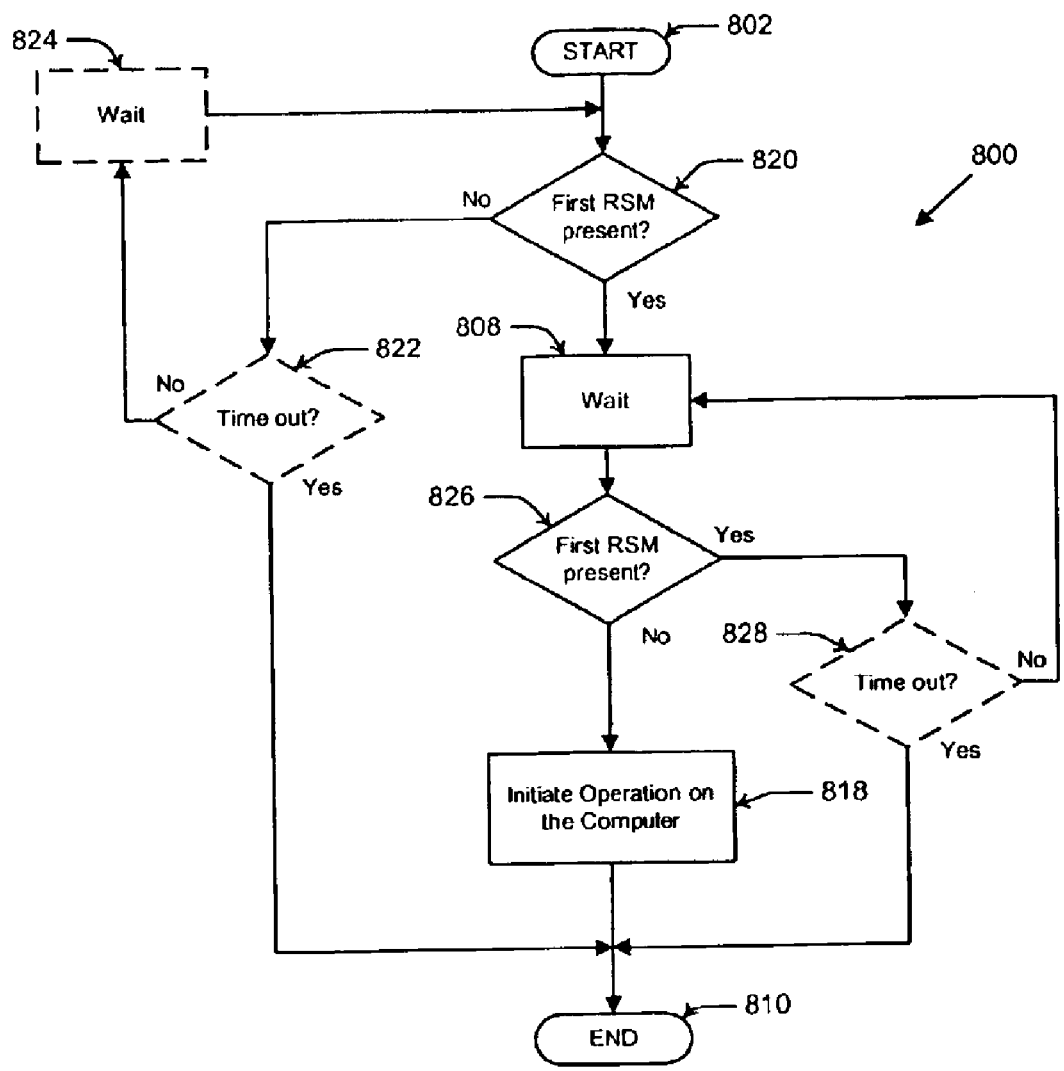
FIG. 8 illustrates a flow diagram of steps of a fourth preferred embodiment of a method of the invention.

Referring now to FIG. 8, steps of a fourth preferred method 800 in accordance with the present invention are illustrated. In accordance with the fourth preferred method 800, only a single RSM is required, such as, for example, any of removable storage media 106,206. The preferred method 800 begins at Step 802 when a program (whether or not RSM-resident and whether or not a bootstrap program) instructs the computer to determine (Step 820) whether a particular RSM is present within the computer configuration. Thus, for example, in the computer configuration 100 of FIG. 1, the computer determines whether a particular DVD or CD-ROM disk is present in the DVD drive. In the computer configuration 200 of FIG. 2, the computer determines whether a particular floppy disk is present in the floppy drive.

Generally, the presence of the RSM is determined by attempting to access a directory or file known to exist on the RSM. Such access includes reading from the RSM and/or writing to the RSM, including the running of a program on the RSM. If access is successful, then the RSM is determined to be present. Thus, for example, the presence of the DVD or CD-ROM disk preferably is determined in the computer configuration 100 of FIG. 1, for example, by checking the drive for a known identifier of the disk. The presence of the floppy disk preferably is determined in the computer configuration 200 of FIG. 2, for example, by checking the floppy drive for a known identifier of the floppy disk.

If the RSM is determined not to be present within the computer configuration at Step 820, then the operation on the computer is not initiated and this preferred method ends (Step 810). Preferably, this preferred method 800 then will have to be started again in order to initiate the operation on the computer. In a variation as shown in dashed lines in FIG. 8, additional attempts to check for the presence of the RSM also may be made in accordance with the present invention. In this regard, the computer may repeat, for a predetermined number of times and/or for a predetermined period of time, additional attempts to determine the presence of the RSM within the computer configuration. Under this optional scenario, a determination is made (Step 822) whether the predetermined number of attempts to determine the presence of the RSM has been reached and/or whether the predetermined time period has expired. If the predetermined number of attempts has not been reached and/or the predetermined time period has not expired, then the computer waits (Step 824) and then again determines (Step 820) the presence of the RSM within the computer configuration. If the predetermined number of attempts has been reached and/or the predetermined time period has expired, then the preferred method ends (Step 810) with no further attempts to determine in Step 820 the presence of the RSM and without initiation of the operation in Step 818.

If the RSM is determined to be present within the computer configuration at Step 820, then the computer determines (Step 826) whether the RSM continues to remain present within the computer configuration. Moreover, in order to enable a user to remove the RSM from the computer configuration after the presence of the RSM is detected, a sufficient period exists between the detection of the presence of the RSM and the check for the continued presence of the RSM within the computer configuration. In this respect, the program preferably instructs the computer to wait (Step 808) for a period that begins after the presence of the RSM is detected and ends before the check for the continued presence of the RSM within the computer configuration is made. Accordingly, a user observing the reading of the RSM followed by the cessation of activity then will have sufficient time in which to remove the RSM before the check is made for the continued presence of the RSM within the computer configuration.

Thus, for example, in the computer configuration 100 of FIG. 1, the computer determines whether the DVD or CD-ROM disk is still present in the DVD drive. In the computer configuration 200 of FIG. 2, the computer determines whether the floppy disk is still present in the floppy drive.

Again, the presence of the RSM is determined by attempting to access a directory or file known to exist on the RSM. Such access includes reading from the RSM and/or writing to the RSM, including the running of a program on the RSM. If access is successful, then the RSM is determined to be present. Thus, for example, the presence of the DVD or CD-ROM disk preferably is determined in the computer configuration 100 of FIG. 1, for example, by checking the drive for a known identifier of the disk. The presence of the floppy disk preferably is determined in the computer configuration 200 of FIG. 2, for example, by checking the floppy drive for a known identifier of the floppy disk.

If the continued presence of the RSM within the computer configuration is determined at Step 826, then the operation on the computer is not initiated and this preferred method ends (Step 810). Preferably, this preferred method 800 then will have to be started again in order to initiate the operation on the computer. In a variation as shown in dashed lines in FIG. 8, additional attempts to check for the continued presence of the RSM also may be made in accordance with the present invention. In this regard, the computer may repeat, for a predetermined number of times and/or for a predetermined period of time, additional attempts to determine the presence of the RSM within the computer configuration. Under this optional scenario, a determination is made (Step 828) whether the predetermined number of attempts to determine the continued presence of the RSM has been reached and/or whether the predetermined time period has expired. If the predetermined number of attempts has not been reached and/or the predetermined time period has not expired, then the computer waits (Step 808) and then again checks (Step 826) for the continued presence of the RSM within the computer configuration. If the predetermined number of attempts has been reached and/or the predetermined time period has expired, then the preferred method ends (Step 810) with no further attempts to determine in Step 826 the continued presence of the RSM and without initiation of the operation in Step 818.

If the first is determined not to be present within the computer configuration at Step 826, then the operation on the computer is initiated (Step 818) and this preferred method ends (Step 810).

In accordance with the fourth preferred method, without successfully determining the presence and then absence of the RSM within the computer configuration in Steps 820, 826, the operation on the computer will not be initiated. The change in presence of the RSM within the computer configuration is a prerequisite to initiation of the operation on the computer.

In view of the foregoing detailed disclosure, it will be apparent that the fourth preferred method 800 of the present invention represents an initiation sequence that must be successfully performed before initiation of an operation on the computer. The operation is thereby protected from accidental initiation because a user's intention to perform the operation is confirmed by the physical removal of the RSM within the computer configuration.

It will further be apparent that in accordance with this preferred method 800, a user's intention to perform the operation is confirmed without requiring the use of user-input and user-output devices. No keyboard, mouse, monitor, microphone, speaker, touch screen, or the like is required in order to perform the initiation sequence of the operation. Nor is an on-screen user prompt required in order to confirm the user's intention to perform the operation on the computer. The physical removal of the RSM from the computer configuration is a physical act that necessarily must be performed by a user at that time and represents confirmation of the user's intentions to initiate and perform the operation on the computer at that time.

A Fifth Preferred Method

Figure 9:
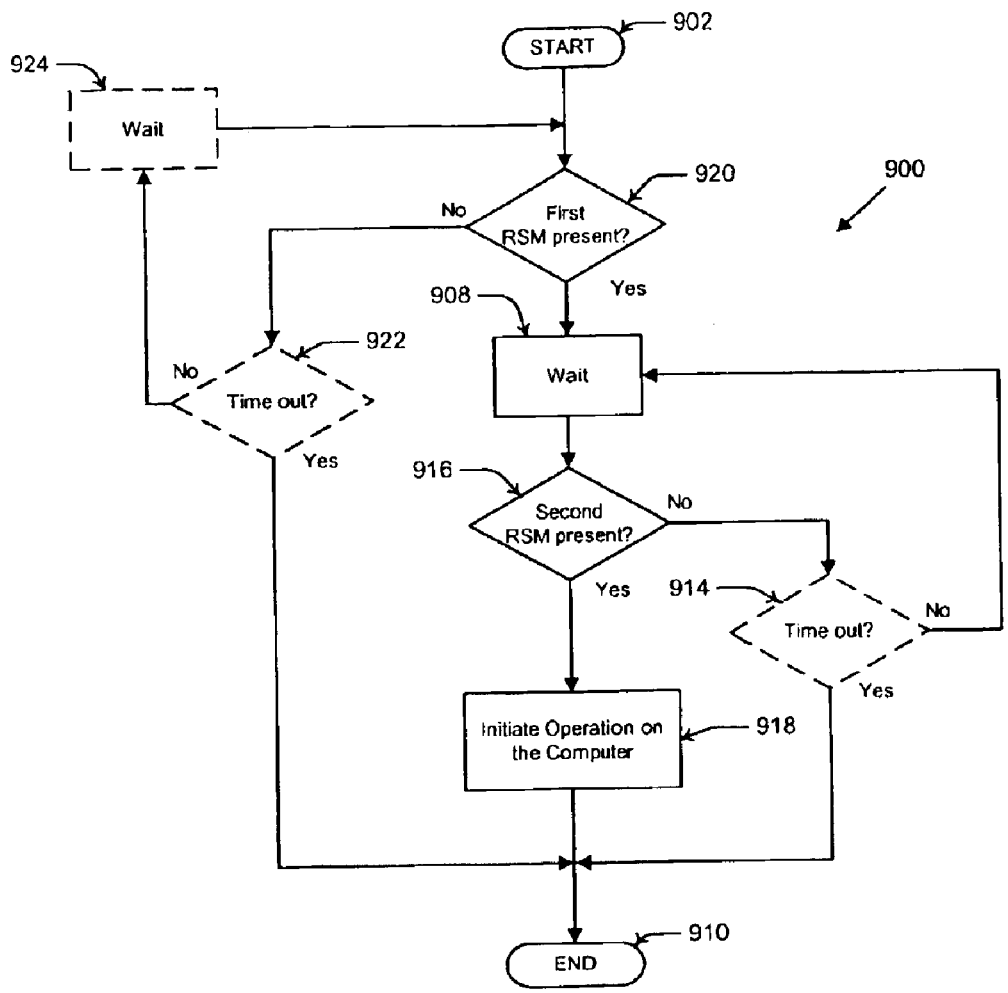
FIG. 9 illustrates a flow diagram of steps of a fifth preferred embodiment of a method of the invention.

Referring now to FIG. 9, steps of a fifth preferred method 900 in accordance with the present invention are illustrated. In accordance with the fifth preferred method 900, a "first" RSM is included in the computer configuration, such as, for example, any of removable storage media 106,206, and a "second" RSM is included in the computer configuration, such as, for example, any of removable storage media 108,208.

The preferred method 900 begins at Step 902 when a program (whether or not RSM-resident and whether or not a bootstrap program) instructs the computer to determine (Step 920) whether the first RSM is present within the computer configuration. Thus, for example, in the computer configuration 100 of FIG. 1, the computer determines whether a first DVD or CD-ROM disk is present in the DVD In the computer configuration 200 of FIG. 2, the computer determines whether a first floppy disk is present in the floppy drive.

Generally, the presence of the first RSM is determined by attempting to access a directory or file known to exist on the first RSM. Such access includes reading from the first RSM and/or writing to the first RSM, including the running of a program on the first RSM. If access is successful, then the first RSM is determined to be present. Thus, for example, the presence of the first DVD or CD-ROM disk preferably is determined in the computer configuration 100 of FIG. 1, for example, by checking the drive for a known identifier of the first disk. The presence of the first floppy disk preferably is determined in the computer configuration 200 of FIG. 2, for example, by checking the floppy drive for a known identifier of the first floppy disk.

If the first RSM is determined not to be present within the computer configuration at Step 920, then the operation on the computer is not initiated and this preferred method ends (Step 910). Preferably, this preferred method 900 then will have to be started again in order to initiate the operation on the computer. In a variation as shown in dashed lines in FIG. 9, additional attempts to check for the presence of the first RSM also may be made in accordance with the present invention. In this regard, the computer may repeat, for a predetermined number of times and/or for a predetermined period of time, additional attempts to determine the presence of the first RSM within the computer configuration. Under this optional scenario, a determination is made (Step 922) whether the predetermined number of attempts to determine the presence of the first RSM has been reached and/or whether the predetermined time period has expired. If the predetermined number of attempts has not been reached and/or the predetermined time period has not expired, then the computer waits (Step 924) and then again determines (Step 920) the presence of the first RSM within the computer configuration. If the predetermined number of attempts has been reached and/or the predetermined time period has expired, then the preferred method ends (Step 910) with no further attempts to determine in Step 920 the presence of the first RSM and without initiation of the operation in Step 918.

If the first RSM is determined to be present within the computer configuration at Step 920, then the computer determines (Step 916) whether the second RSM is present within the computer configuration. Thus, for example, in the computer configuration 100 of FIG. 1, the computer determines whether the second DVD or CD-ROM disk is present in the DVD drive. In the computer configuration 200 of FIG. 2, the computer determines whether the second floppy disk is present in the floppy drive.

The presence of the second RSM is determined by attempting to access a directory or file known to exist on the second RSM. Such access includes reading from the second RSM and/or writing to the second RSM, including the running of a program on the second RSM. If access is successful, then the second RSM is determined to be present. Thus, for example, the presence of the second DVD or CD-ROM disk preferably is determined in the computer configuration 100 of FIG. 1, for example, by checking the drive for a known identifier of the second disk. The presence of the second floppy disk preferably is determined in the computer configuration 200 of FIG. 2, for example, by checking the floppy drive for a known identifier of the second floppy disk.

If the second RSM is determined not to be present within the computer configuration, then the operation on the computer is not initiated and this preferred method ends (Step 910). Preferably, this preferred method 900 will have to be started again in order to initiate the operation on the computer. If the second RSM is determined to be present within the computer configuration, then the operation on the computer is initiated (Step 918) and this preferred method ends (Step 910).

In order to enable a user to replace the first RSM with the second RSM after the presence of the first program is determined in Step 920, a sufficient period exists between the determination (Step 920) of the presence of the first RSM and the check (Step 916) for the presence of the second RSM within the computer configuration. In this respect, the program preferably instructs the computer to wait (Step 908) for a period that begins after the first program is read from the first RSM and ends before a check is made for the second RSM. Accordingly, a user observing the reading of the first RSM followed by the cessation of activity then will have sufficient time in which to substitute the second RSM for the first RSM before the check is made for the presence of the second RSM within the computer configuration.

In a variation as shown in dashed lines in FIG. 9, additional attempts to check for the presence of the second RSM also may be made in accordance with the present invention. In this regard, the computer may repeat, for a predetermined number of times and/or for a predetermined period of time, additional attempts to determine the presence of the second RSM within the computer configuration. Under this optional scenario, a determination is made (Step 914) whether the predetermined number of attempts to determine the presence of the second RSM has been reached and/or whether the predetermined time period has expired. If the predetermined number of attempts has not been reached and/or the predetermined time period has not expired, then the computer waits (Step 908) and then again checks (Step 916) for the presence of the second RSM within the computer configuration. If the predetermined number of attempts has been reached and/or the predetermined time period has expired, then the preferred method ends (Step 910) with no further attempts to determine in Step 916 the presence of the second RSM and without initiation of the operation in Step 918.

In accordance with the fifth preferred method, without successfully determining the presence of the second RSM within the computer configuration in Step 916, the operation on the computer will not be initiated. The presence of the second RSM (prior to the detection of the presence of the first RSM within the computer configuration) is a prerequisite to initiation of the operation on the computer.

In view of the foregoing detailed disclosure, it will be apparent that the fifth preferred method 900 of the present invention represents an initiation sequence that must be successfully performed before initiation of an operation on the computer. The operation is thereby protected from accidental initiation because a user's intention to perform the operation is confirmed by the physical exchange of the removable media within the computer configuration.

It will further be apparent that in accordance with this preferred method 900, a user's intention to perform the operation is confirmed without requiring the use of user-input and user-output devices. No keyboard, mouse, monitor, microphone, speaker, touch screen, or the like is required in order to perform the initiation sequence of the operation. Nor is an on-screen user prompt required in order to confirm the user's intention to perform the operation on the computer. The physical substitution of the second RSM for the first RSM within the computer configuration is a physical act that necessarily must be performed by a user at that time and represents confirmation of the user's intentions to initiate and perform the operation on the computer at that time.

A Sixth Preferred Method

Figure 10:
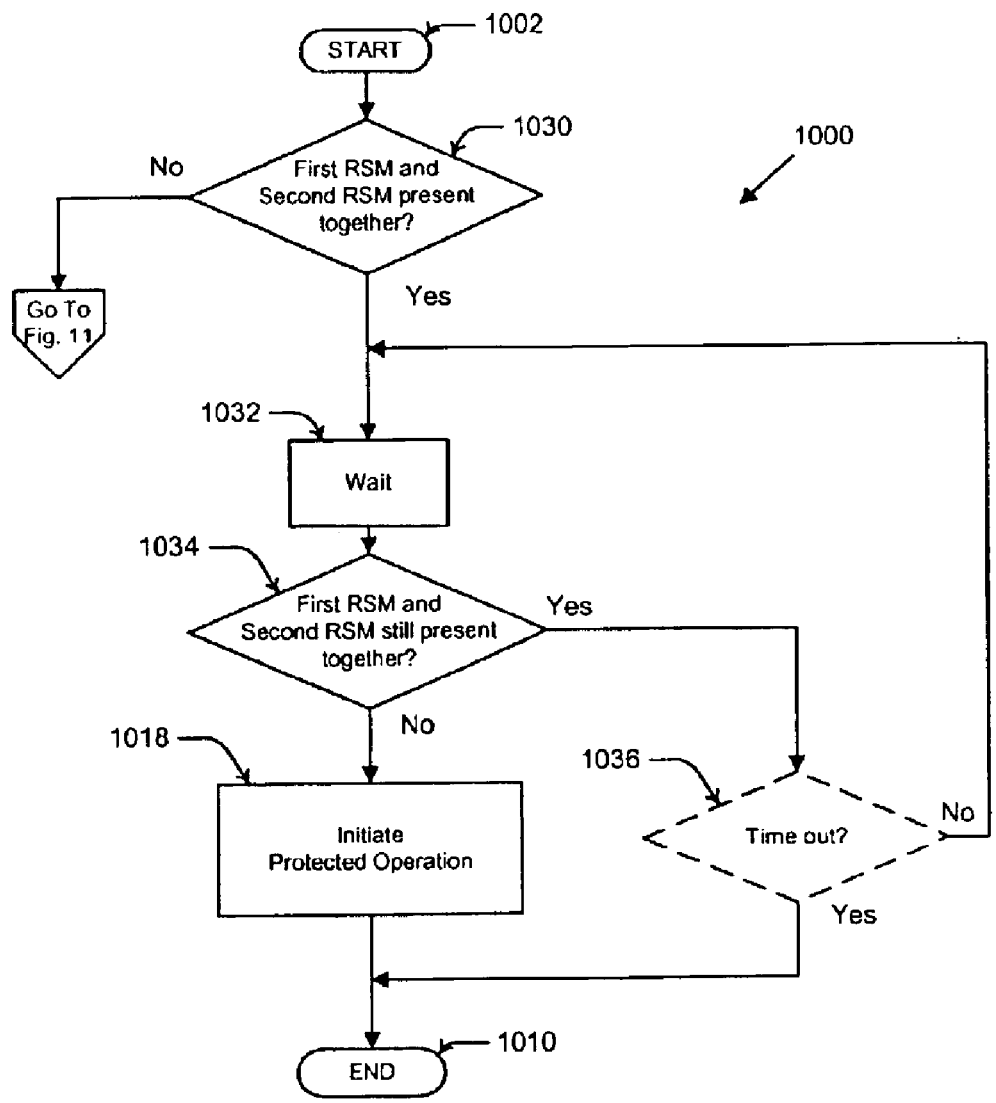
FIG. 10 illustrates a flow diagram of steps of a sixth preferred embodiment of a method of the invention.
Figure 11:
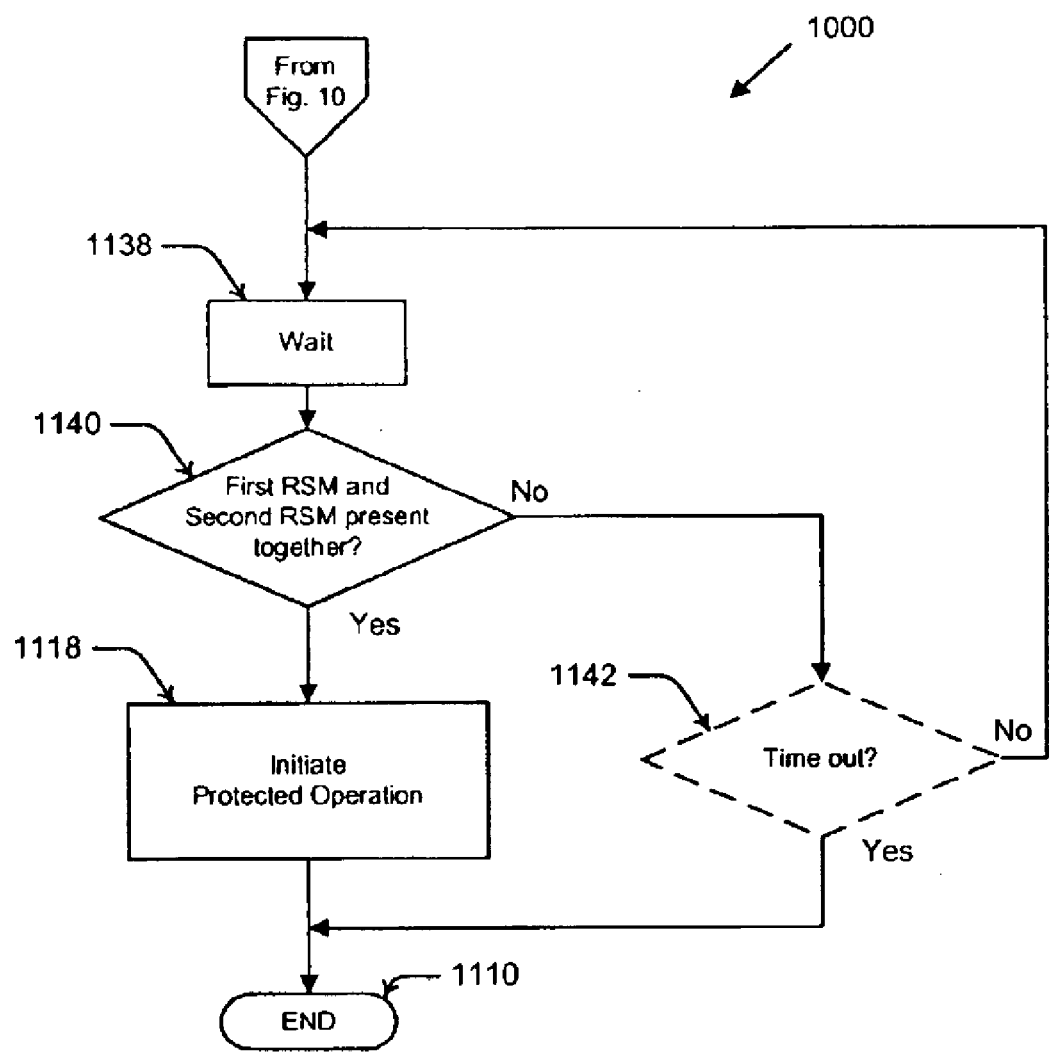
FIG. 11 illustrates a flow diagram of additional steps of the sixth preferred embodiment.

Referring now to FIGS. 10–11, steps of a sixth preferred method 1000 in accordance with the present invention are illustrated. In accordance with the sixth preferred method 1000, a "first" RSM is included in the computer configuration, such as, for example, any of removable storage media 306,406, and a "second" RSM is included in the computer configuration, such as, for example, any of removable storage media 308,408.

The preferred method 1000 begins (Step 1002) when a program (whether or not RSM-resident and whether or not a bootstrap program) instructs the computer to determine (Step 1030) whether the first RSM and the second RSM are present together within the computer configuration. Thus, for example, in the computer configuration 300 of FIG. 3, the computer determines whether the first and second DVD or CD-ROM disks are present in the DVD drives (hardware 304). In the computer configuration 400 of FIG. 4, a determination is made whether the first and second floppy disks are present in the floppy drives of the computers 202,416.

Generally, the presence of each of the first RSM and the second RSM is determined by attempting to access a directory or file known to exist on the first RSM and a directory or file known to exist on the second RSM. Such access includes reading from each RSM and/or writing to each RSM, including the running of a program thereon. If access is successful, then the RSM is determined to be present. The check for both media may be performed in sequence or in parallel.

If both the first RSM and the second RSM are determined in Step 1030 to be present together within the computer configuration, then the computer determines (Step 1034) whether the first RSM and the second RSM continued to remain present together within the computer configuration. Moreover, in order to enable a user to remove the first RSM and/or the second RSM from the computer configuration after the presence of both are detected, a sufficient period exists between the detection of the presence of both and the check for the continued presence of both within the computer configuration. In this respect, the program preferably instructs the computer to wait (Step 1032) for a period that begins after the presence of both is detected and ends before the check in Step 1034 is made. Accordingly, a user observing the reading of the first RSM and the second RSM followed by the cessation of activity then will have sufficient time in which to remove the first RSM and/or the second RSM before the check is made for the continued presence of both within the computer configuration.

Thus, for example, in the computer configuration 300 of FIG. 3, the computer determines whether the first and second DVD or CD-ROM disks remain present in the DVD drives (hardware 304). In the computer configuration 400 of FIG. 4, the computer determines whether the first and second floppy disks remain present in the floppy drives of the computers 202,416. The check for both media may be performed in sequence or in parallel.

If the continued presence within the computer configuration of the first RSM and the second RSM is detected in the determination at Step 1034, then the operation on the computer is not initiated and this preferred method ends (Step 1010). Preferably, the preferred method 1000 will have to be started again in order to initiate the operation on the computer. If the continued presence within the computer configuration of the first RSM and the second RSM is not detected in the determination (Step 1034), then the operation on the computer is initiated (Step 1018), and then this preferred method ends (Step 1010).

In a variation of the sixth preferred method 1000 as shown in dashed lines in FIG. 10, additional attempts to check for the presence of both the first RSM and the second RSM also may be made in accordance with the present invention. In this regard, the computer may repeat, for a predetermined number of times and/or for a predetermined period of time, additional attempts to determine the continued presence of both within the computer configuration. Under this optional scenario, a determination is made (Step 1036) whether the predetermined number of attempts to determine the continued presence of both has been reached and/or whether the predetermined time period has expired. If the predetermined number of attempts has not been reached and/or the predetermined time period has not expired, then the computer again waits (Step 1032) and then determines (Step 1034) the continued presence of both within the computer configuration. If the predetermined number of attempts has been reached and/or the predetermined time period has expired, then the preferred method ends (Step 1010) with no further attempts to determine in Step 1034 the continued presence of both and without initiation of the operation in Step 1018.

If one or more of the first RSM and the second RSM are determined in Step 1030 to be absent from the computer configuration, then the computer determines (Step 1140) whether the first RSM and the second RSM are present together within the computer configuration. Moreover, in order to enable a user to insert the first RSM and/or the second RSM within the computer configuration, a sufficient period exists between the detection of the absence of both in Step 1030 and the check in Step 1140 for the presence of both within the computer configuration. In this respect, the program preferably instructs the computer to wait (Step 1138) for a period that begins after the check in Step 1030 is made and before the check in Step 1140 is made. Accordingly, a user observing the attempted reading of the first RSM and the second RSM followed by the cessation of activity then will have sufficient time in which to include the first RSM and/or the second RSM within the computer configuration before the check in Step 1140 is made for the presence of both within the computer configuration.

If the continued absence within the computer configuration of the combination of the first RSM and the second RSM is detected in Step 1140, then the operation on the computer is not initiated and this preferred method 1000 ends (Step 1110). Preferably, the preferred method 1000 will have to be started again in order to initiate the operation on the computer. If the continued absence within the computer configuration of the combination of the first RSM and the second RSM is not detected in Step 1140, then the operation on the computer is initiated (Step 1118), and then this preferred method 1000 ends (Step 1110).

In a variation of the sixth preferred method 1000 as shown in dashed lines in FIG. 11, additional attempts to check for the combined presence of both the first RSM and the second RSM also may be made in accordance with the present invention. In this regard, the computer may repeat, for a predetermined number of times and/or for a predetermined period of time, additional attempts to determine the combined presence of the first RSM and the second RSM within the computer configuration. Under this optional scenario, a determination is made (Step 1142) whether the predetermined number of attempts to determine the combined presence of both has been reached and/or whether the predetermined time period has expired. If the predetermined number of attempts has not been reached and/or the predetermined time period has not expired, then the computer again waits (Step 1138) and then determines (Step 1140) the combined presence of both within the computer configuration. If the predetermined number of attempts has been reached and/or the predetermined time period has expired, then the preferred method 1000 ends (Step 1110) with no further attempts to determine in Step 1140 the combined presence of both and without initiation of the operation in Step 1118.

In view of the foregoing detailed disclosure, it will be apparent that the sixth preferred method 1000 of the present invention represents an initiation sequence that must be successfully performed before initiation of an operation on the computer. The operation is thereby protected from accidental initiation because a user's intention to perform the operation is confirmed by the physical state-change of the combined presence of the removable storage media within the computer configuration.

It will further be apparent that in accordance with this preferred method 1000, a user's intention to perform the operation is confirmed without requiring the use of user-input and user-output devices. No keyboard, mouse, monitor, microphone, speaker, touch screen, or the like is required in order to perform the initiation sequence of the operation. Nor is an on-screen user prompt required in order to confirm the user's intention to perform the operation on the computer. The state-change in the combined, physical presence of the combination of the first RSM and the second RSM within the computer configuration represents a physical act that necessarily must be performed by a user at that time and represents confirmation of the user's intentions to initiate and perform the operation on the computer at that time.

Exemplary Commercial Utilizations of the Present Invention

The following represent examples of contemplated commercial utilizations of the present invention.

Keystroke Emulation Program

FIRST PREFERRED METHOD EXAMPLE

In certain circumstances, it is desirable to emulate keystrokes, especially when a keyboard or keypad is absent, malfunctioning, or otherwise unavailable. For instance, one may desire to create a backup of one's hard drive on a laptop computer using a backup program on the hard drive. This may be impossible, or at least very difficult, without the use of a keyboard.

Utilizing the first preferred method of the present invention, a first RSM comprising a bootstrap disk is inserted into a drive of the laptop and the laptop is then started. During booting of the laptop, the laptop boots from the bootstrap disk. In accordance with the first preferred method, the bootstrap disk includes a program that is executed by the laptop that causes the computer to run from the drive a particular program that is stored on another, second disk. The laptop runs this particular program after a period of cessation of drive activity during booting of the laptop.

Upon this cessation of drive activity, a user monitoring the drive activity substitutes the second disk having this particular program for the bootstrap first disk in the laptop drive. Accordingly, when the laptop runs the specified program from the drive, this disk having the program is within the drive and the laptop runs the program successfully.

The program on the second disk emulates keystrokes of a user. In this regard, the sequence of keystrokes is predetermined and indicates the execution of the backup program on the laptop's hard drive. Moreover, the sequence of keystrokes preferably identifies a backup location external to the laptop, such as, for example, a network storage device or a USB hard drive attached directly to a USB port of the laptop.

The program emulating the predetermined sequence of keystrokes preferably is not a bootstrap program. Rather, the first, bootstrap disk, which causes the computer to execute the keystroke emulation program, preferably is a prerequisite to initiation of the keystroke emulation program. Consequently, inadvertently booting the laptop with either the first disk or the second disk does not result in the unintended performance of the backup operation.

Partitioning and Formatting

SECOND PREFERRED METHOD EXAMPLE, FOURTH PREFERRED METHOD EXAMPLE

Preparing a hard drive for installation of an MS-DOS operating system requires execution of "FDISK," a program that creates and manages partitions on a hard drive, and subsequent execution of "FORMAT," a program that readies a partition for installation of the operating system. Partitioning and formatting of a hard drive, however, is a drastic action, as any data on the hard drive is lost by such operation.

The second preferred method of the present invention is useful in safeguarding against unintended partitioning and formatting. In particular, a first RSM comprising a bootstrap disk having a bootstrap program that is executed by a computer upon boot up is inserted into a drive of the computer. Upon boot up, the bootstrap program includes execution of the FDISK program, but only upon the determination that a second disk having the FORMAT program is within the drive. In this regard, the first, bootstrap disk does not include the FORMAT program. The FDISK is not run if the particular disk having the FORMAT program is not found within the drive. Furthermore, it should be noted that the FORMAT program is not run prior to the execution of the FDISK program; rather, just its presence within the drive is determined.

This determination is made after a period of cessation of drive activity during booting of the computer. Upon cessation of drive activity, a user monitoring the drive activity substitutes the second disk having the FORMAT program for the bootstrap first disk. Accordingly, when the computer checks for the presence of the FORMAT program in the drive, the FORMAT program is found and the FDISK program is executed successfully.

The presence of the second disk having the FORMAT program preferably is a prerequisite to successful execution of the FDISK program. Consequently, inadvertently booting the computer from the first, bootstrap disk does not result in the unintended performance of the partitioning operation.

Following successful execution of the FDISK program, the computer must be rebooted in order to successfully format the new partition. In this regard, the second disk preferably is a bootstrap disk having a bootstrap program that executes the FORMAT program. The fourth preferred method of the present invention safeguards against accidental running of the bootstrap program on this second disk.

Specifically, the bootstrap program on the second disk runs the FORMAT program only after the determination is made that the second disk no longer resides within the computer drive (of course, this program and the FORMAT program is read from the second disk before its removal from the drive). This determination is made after a period of cessation of drive activity during rebooting of the computer. Upon cessation of drive activity, a user monitoring the drive activity removes the second disk having the FORMAT program from the drive. Accordingly, when the computer checks for the absence of the disk from the drive (such as by checking for the continued presence of the FORMAT program), the absence of the disk is confirmed and the FORMAT program is executed successfully.

The absence from the drive of the second disk having the FORMAT program preferably is a prerequisite to successful execution of the FORMAT program. Consequently, inadvertently booting the computer from the second, bootstrap disk does not result in the unintended performance of the formatting operation.

Headless Server Restore and Backup

SECOND PREFERRED METHOD EXAMPLE

Another example of a commercial utilization of the second preferred method of the present invention includes backup and restore operations on a headless server. In this context, inadvertent or unauthorized restoration of a backup image on a headless or blind server can destroy valuable data. In accordance with the second preferred method of the present invention, the restore program is stored on a first bootstrap RSM such as a disk. Upon booting from this bootstrap disk, a bootstrap program thereon checks after a period of cessation of drive activity for the presence of a second RSM, such as another disk, within the drive prior to performing the restore operation. Preferably, this second disk is not a bootstrap disk.

Accordingly, this sequence of physical exchange of the first disk for the second disk ensures that it is impossible to inadvertently perform a restore operation by leaving the first disk in the drive and later rebooting the headless server. In addition, the insertion of the second disk ensures that, even if the second disk is inadvertently left in the computer, the restore operation nevertheless will not be executed upon the later reboot, as the second disk does not contain the restore program.

Advantageously, if the checking for the presence of the second disk within the drive includes reading of a file known to exist on the second disk, then the actual content of the file can be used to indicate a specific location of the backup data and other associated parameters of the restore operation, including a unique server identification Furthermore, each server has a unique identification in a server farm. In this context, when the second disk is checked, the content of the file on the second disk can further include a unique server identification corresponding to the identified location of the backup data and the associated parameters for one of the servers in the farm. In this manner, the correct backup data for a particular server can be identified, and the restoration of one server's backup data to another server can be avoided.

Correspondingly, an inadvertent or unauthorized saving of a backup image from a headless or blind server can likewise destroy previously saved backup files. As in the restore operation, the second preferred method of the present invention can safeguard against this disaster. In this case, the backup operation to successfully execute from a first RSM will require, as a prerequisite, the insertion of a the second RSM, which can be additionally used to load backup parameters and save operation results.

An additional benefit to utilization of the second preferred method in these restore and backup examples is the ability to separately distribute the first RSM and the second RSM to different people, thereby preventing backup or restore operations by a single individual.

Remote Network Install on Local Machine

THIRD PREFERRED METHOD EXAMPLE

In certain arrangements it may be desirable to install a program on a local machine that is connected to a network, wherein the installation program itself is centrally located on a network attached device (NAD). The installation, however, may destroy important data on the local machine if inadvertently performed, or if inadvertently performed remotely on the wrong local machine (hundreds or even thousands of local machines can exist on a network). In order to ensure installation to the proper machine, and to limit unintentional installations, the third preferred method of the present invention is utilized.

In accordance with the third preferred method of the present invention, when an installation is to be performed at a local machine, a technician physically disposed at the local machine inserts a first RSM comprising a first disk into a drive associated with the local machine. The computer reads an identifier from the drive that is unique to, and thereby identifies to the local computer, the program to be installed on the local machine from the central network location. Upon reading of the first identifier, the technician removes the first disk and inserts a second disk into the same drive, and after a predetermined period, the computer reads a second, known identifier from the second disk. The second identifier is known because the computer retrieves the second identifier from a central database of the network where the second identifier is maintained in association with the first identifier read from the drive. Upon the successful reading of the second identifier from the drive, the computer initiates the installation program for installation to the local machine from the central network location. If the second identifier is not successfully read from the drive, either because the second disk was not placed within the drive or because the wrong disk was placed within the drive, then the known, second identifier is not successfully read from the drive and the installation operation is not initiated.

The determination of whether the second disk is within the drive by reading of the known second identifier therefrom is made after a predetermined period of cessation of drive activity following the reading of the first identifier. Thus, the technician has adequate time for withdrawal of the first disk following reading thereof and insertion of the second disk. Accordingly, when the computer checks for the presence of the second disk following this predetermined period, the known second identifier will be successfully read, the second disk will be determined to be present, and the installation operation will be initiated.

In accordance with the third preferred method, the physical replacement of the first disk with the second disk is a prerequisite to the installation from the remote network location. Consequently, a technician must be physically present at the local machine at the time of installation. Accordingly, the chances of the program being installed to the wrong local machine are eliminated.

Dangerous Program Isolation

FOURTH PREFERRED METHOD EXAMPLE

Execution of programs that, if inadvertently or maliciously executed would cause severe damage, may be contained in accordance with the fourth preferred method of the present invention. In this regard, such a program is stored on a RSM such as a disk and not, for example, on a hard drive of a computer. This physical isolation of the program safeguards against malicious execution of the program by someone merely gaining access to the computer and its nonremovable storage media.

In accordance with the fourth preferred method, to execute the program, the disk is inserted into a drive of the computer. Upon running, the program first checks to determine whether the disk remains in the drive following a cessation of drive activity. If the disk remains in the drive, then the program ends without successfully executing. If it is determined that the disk is absent from the drive, then the program successfully executes.

In this example, the program may or may not comprise a bootstrap program and/or may or may not reside upon a bootstrap disk. However, if the program does comprise a bootstrap program, or resides on a bootstrap disk and is called by the bootstrap program, then the required removal of the disk ensures that the dangerous program cannot be inadvertently executed upon a reboot of the computer merely by leaving the disk within the drive. In addition to ensuring that the protected operation is intentional, the requirement that the disk be removed makes it less likely for a technician to misplace a disk containing a dangerous program by leaving it behind in a drive.

Protected Access to Computer-Resident File

FOURTH PREFERRED METHOD EXAMPLE, FIFTH PREFERRED METHOD EXAMPLE

It may be desirable to limit access to a file that exists on nonremovable storage media of a computer. In accordance with either the fourth or fifth preferred methods of the present invention, such access may be limited to a user possessing a particular RSM, such as a disk.

In this regard, such a file is stored on the nonremovable media in an encrypted form. In accordance with the fourth preferred method, a program resides on the RSM that enables decryption of the file when run. The program may or may not comprise a bootstrap program, and the RSM may or may not comprise a bootstrap medium. When run, the program first checks for the removal of the RSM from the computer configuration before actually decrypting the file.

Accordingly, the user must remove the RSM from the computer configuration prior to decryption of the file and, therefore, the user is less likely to leave the RSM within the computer configuration, thereby compromising the protected access to the file.

Alternatively, in accordance with the fifth preferred method, a key resides on the RSM that enables decryption of the file when an encryption/decryption program residing on the nonremovable storage media is run. When run, the program first checks, after reading of the key from the RSM, for the removal of the RSM from the computer configuration before actually decrypting the file. Accordingly, the user must remove the RSM from the computer configuration prior to decryption of the file and, therefore, the user is less likely to leave the RSM within the computer configuration, thereby compromising the protected access to the file.

Headless Server Backup and Restore

FOURTH PREFERRED METHOD EXAMPLE

In yet another example of the fourth preferred method of the present invention, inadvertent or unauthorized restoration of a backup image on a headless or blind server can destroy valuable data. The restore program is placed on a bootstrap RSM. The method loads a restore program to computer memory, and then confirms timely removal of the RSM from the computer configuration. The restore program is then executed. This initiation sequence ensures that it is difficult to inadvertently perform a restore operation. In addition, the removal of the RSM ensures that, even if the computer should reboot with the RSM present within the computer configuration, the computer will not again execute the restore program. An inadvertent or unauthorized saving of a backup image from a headless or blind server can likewise destroy previously saved backup files. As in the restore operation, the backup operation will require the timely removal of the bootstrap RSM before the backup operation is initiated.

Vending and Gaming Machine Maintenance

FIFTH PREFERRED METHOD EXAMPLE

Casino gaming machines and vending machines can be equipped with card readers that read a card when inserted therein. The card could comprise a magnetic stripe card. Indeed, such card readers are common in casinos for recording gamblers' betting habits, and vending machines are equipped with magnetic card readers, which allow processing of credit cards.

Furthermore, it should be noted that, in examples of commercial utilizations of the present invention that follow, such magnetic card readers require the card to be inserted therein for reading and are not swipe readers, wherein the card holder retains possession of the card and merely passes the magnetic stripe by the card reader. In these particular readers, possession of the card is passed from the card holder to the card reader.

In an example of a commercial utilization of the fifth preferred method, when a casino gaming machine or vending machine is to be placed in a maintenance mode, a RSM comprising a card is placed in the card reader. A computer reads the card utilizing the card reader and checks that the card contains stored thereon a predetermined security code required for placing the machine in maintenance mode. Upon reading of the card, the computer again utilizes the card reader to determine if the card has been removed therefrom. If the card has been removed from the reader and the predetermine security code was read, then the computer initiates the required program for placing the machine into maintenance mode, which may include releasing a mechanical lock or otherwise enabling maintenance to be performed on the machine.

The determination of whether the card has been removed from the card reader is made after a predetermined period of time following the first reading of the card, such as fifteen seconds. Thus, upon insertion of the card, a card holder then has adequate time for withdrawal of the card following reading thereof. Accordingly, when the computer checks for the presence of the card following this predetermined time period, the card will not be found and the machine will be placed into maintenance mode (assuming that the appropriate security code was read).

The removal of the card having the security code is a prerequisite to successful placement of the machine into maintenance mode. Consequently, inadvertently leaving the card within the reader will not place the machine into maintenance mode, even if the card contains the appropriate security code. Moreover, the chances of the card holder leaving the card in the card reader following maintenance are eliminated, as the card must be withdrawn from the card reader to place the machine into the maintenance mode.

Automated Teller Machine Key

FIFTH PREFERRED METHOD EXAMPLE

Automated teller machines (ATMs) have become very popular. The computer systems associated with ATMs use a magnetic stripe card to identify a card holder and a keyboard entry code to authenticate the card holder. A common problem that occurs with ATMs is the "drive-away" or "walk-away," wherein the authenticated card holder forgets to take back the card from the ATM card reader following a completed transaction and leaves without terminating the authenticated session. During this period, before the ATM machine times out, someone else may approach the ATM machine and conduct additional transactions during the authenticated session.

In a further example of commercial utilization of the fifth preferred method, when a transaction is to be performed via an ATM, a RSM comprising a card is placed in the card reader. The computer of the ATM reads an identifier from the card utilizing the card reader. Upon reading of the card, the computer again utilizes the card reader to determine if the card has been removed from the card reader. If the card has been removed from the reader, and the PIN entered at the ATM matches the PIN associated with the account identified by the identifier read from the card, then the computer initiates the required program for performing a requested transaction at the ATM.

The determination of whether the card has been removed from the card reader is made after a predetermined period of time following the first reading of the card, such as fifteen seconds. Thus, upon insertion of the card, a card holder then has adequate time for taking the card back following reading thereof. Accordingly, when the computer checks for the presence of the card following this predetermined time period, the card will not be found and the required program for performing a requested transaction at the ATM will be initiated (assuming that the appropriate PIN was input).

The removal of the card is a prerequisite to successfully performing a transaction at the ATM. Consequently, inadvertently leaving the card within the reader will preclude the performance of a successful transaction, even if the correct PIN has been entered. Accordingly, the chances of the card holder leaving the card in the card reader following an authentic transaction during an authenticated session are eliminated, as the card must be withdrawn from the card reader to perform the authentic transaction.

Moreover, in order to perform additional transactions during the authenticated session, the card must be placed within the card reader, the appropriate identifier read, removed from the card reader, and the absence of the card detected in order to perform each additional transaction. During the performance of these additional transactions, the PIN need not be reentered, but the card must be inserted, read, withdrawn, and its absence detected for each such transaction.

Accounting Machine (Cash Register) Reset

FIFTH PREFERRED METHOD EXAMPLE

An embedded computer system used in accounting machines, such as cash registers, can be provided with features that traditionally require mechanical key locks. For instance, accounting machines often maintain multiple sets of value accumulation registers. During normal operation, when the accumulators are printed or otherwise transmitted, i.e., "dumped," the accumulator values are not modified. When a special mode is enabled, however, the accumulators are reset after printing or transmission.

In yet another example of commercial utilization of the fifth preferred method of the present invention, when an accumulator is to be reset after printing or transmission, a RSM comprising a card is placed in the card reader. The computer of the accounting machine reads an identifier from the card utilizing the card reader. Upon reading of the card, the computer again utilizes the card reader to determine if the card has been removed from the card reader. If the card has been removed from the reader, and the identifier read from the card matches a predetermined identifier, then the computer initiates the required program for resetting the accumulator following transmission or printing.

The determination of whether the card has been removed from the card reader is made after a predetermined period of time following the first reading of the card, such as fifteen seconds. Thus, upon insertion of the card, a card holder then has adequate time for withdrawal of the card following reading thereof. Accordingly, when the computer checks for the presence of the card following this predetermined time period, the card will not be found and the required command for resetting the accumulator will be given, thereby initiating the resetting operation, assuming of course that the appropriate identifier has been read from the card.

In accordance with the fifth preferred method, the removal of the card is a prerequisite to the successful resetting of the accumulator. Consequently, inadvertently leaving the card within the reader will preclude a successful resetting of the accumulator. Accordingly, the chances of the card holder leaving the card in the card reader following the resetting of the accumulator are eliminated, as the card must be withdrawn from the card reader in order to perform the resetting operation.

Safety Deposit Box Access

SIXTH PREFERRED METHOD EXAMPLE

Safety deposit boxes are used in banks, hotels, and other areas to allow secure storage of valuables. These boxes can only be opened when two mechanical keys are engaged at the same time. Typically, one key is held by an authority, such as a banker or hotel manager. The second key is held by the box holder. Safety deposit boxes are more secure than single lock boxes because the loss of a single key does not compromise access to the box. Furthermore, an authority can identify the user and record box access. On the other hand, physical keys are difficult to replace and usually require a lock smith to drill the lock if a key is lost by the box holder. This drawback to safety deposit boxes is overcome with the six preferred method of the present invention.

In this regard, the box authority has a first RSM such as, for example, a key card, that identifies the authority to the computer controlling access to the box, and the box holder posses a second RSM such as, for example, a key card, that identifies the box holder to the computer controlling access to the box. Two card readers are provided in communication with the computer, and the combined presence of both the key card of the authority and the key card of the box holder within the computer configuration by placement thereof into the card readers indicates initiation of the program granting access to the box.

When the key card is lost by the box holder, the lost key card must be replaced with a new key card. The replacement of the key card is accomplished in accordance with the sixth preferred method of the present invention by first inserting the key card of the authority into one of the card readers. The computer detects the presence of the key card of the authority and the absence of a key card of the box holder. Following a predetermined period, a key card having a new identifier of the box holder is inserted into the other card reader and the combined presence of both key cards are detected within the computer configuration. However, because the computer detects the presence of a key card having an identifier different from the active identifier stored in its database for the box holder, and because the computer first detected the presence of the key card of the authority without the presence of the key card of the box holder, the computer initiates a program that activates the new identifier of the box holder in the database and deactivates the old identifier.

Confirmation of this change is also performed in accordance with the sixth preferred method of the present invention. In this regard, to confirm this change recorded by the computer, the key card of the authority is withdrawn from the card reader following the detected presence of both key cards within the computer configuration. Following a predetermined period, the computer determines the continuing presence of the key card of the box holder and the absence of the key card of the authority. This change in the combined presence of the two key cards within the computer configuration indicates the initiation of a program that confirms the change in key cards of the box holder. The new key card of the box holder is then removed and, thereafter, insertion of both the key card of the authority and the new key card of the box holder into the card readers then indicates access to the box.

In this example, the possible key cards of the box holder are provided to the box holder when the box is established for the box holder, with only one of the key cards actually being activated at that time by the aforementioned process. The other key cards are simply retained by the box holder for later activation upon the loss of the initial key card. By possessing the possible key cards for access to the box, the box holder is assured that the account authority cannot gain access to the contents of the box without the active key card of the box holder.

Scope of the Present Invention

In view of the foregoing detailed description of preferred embodiments of the present invention, it readily will be understood by those persons skilled in the art that the present invention in all its aspects is susceptible of broad utility and application. While various embodiments of the present invention have been described herein in certain contexts, the embodiments may be useful in other contexts as well. Many embodiments and adaptations thereof other than those herein described, as well as many variations, modifications, and equivalent arrangements, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for one or more preferred embodiments of the present invention. It should also be understood that, although steps of various processes may be shown and described as being in a preferred sequence or temporal order, the steps of any such processes are not limited to being carried out in any particular sequence or order, absent a specific indication of such. In many cases, the steps of such processes may be able to be carried out in various different sequences and orders, while still falling within the scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements thereof, the present invention being limited only by the claims appended hereto and the equivalents thereof.

Thus, the use of "program" herein may refer not only to a standalone set of code, but also to a snippet of code or a module forming part of a larger program. Furthermore, for example, a laptop computer 102 is shown in FIG. 1 only for purposes of illustrating a digital computer. The laptop computer 102 further represents, for example, a desktop, a tower computer, and a headless server, as well as an embedded computer such as those computers found in ATMs, cash registers, vending machines, gaming machines, autos, appliances, etc. Similarly, the headless server 202 of FIG. 2 equally could be the laptop computer 102 as shown in FIG. 1, etc. The DVD or CD-ROM disks 106,108, and the floppy disks 206,208, are shown only for purposes of illustrating different types of removable storage media. The disks further represent, for example, optical disks, floppy disks, Zip disks, and the like, with the DVD drive 104 and disk drive 204 each representing the appropriate type of hardware of the computer configuration for reading thereof by the computer. In general, the disks 106,108 represent any type of removable storage media that can be read by the computer 102, such as USB hard disk drives, USB memory devices, and the like.

Thus, for example, when the removable storage media include USB devices, the computer configuration includes a USB port as the hardware for reading of the USB devices; when the removable storage media include serial devices, the computer configuration includes a serial port as the hardware for reading the serial devices; when the removable storage media include parallel devices, the computer configuration includes a parallel port as the hardware for reading the parallel devices; when the removable storage media include a SCSI device, the computer configuration includes a SCSI connection as the hardware for reading the SCSI devices; and when the removable storage media include infrared devices, the computer configuration includes an infrared port as the hardware for reading the infrared devices, etc.

In accordance with the present invention, the RSM also could further comprise a card, such as a card having a magnetic strip and/or a "smart card" having a chip carried thereon. In such instance, the computer configuration includes a card reader as the hardware in which the card must be inserted to be read. Alternatively, if the card is capable of wireless communications by transmitting a signal, then the card need only be brought within the communication range of the hardware to be read. Removal of the card from this communication range then would constitute removal of the card from the computer configuration.

The preferred methods have also been described as including the booting of the computer from a removable bootstrap storage medium. A variation of the present invention further includes these preferred methods absent the actual booting of the computer from such removable storage media. Instead, it is contemplated within the scope of the invention that the computer be booted from other storage media such as a hard disk of the computer configuration, a remote server in a networked computer configuration, etc., while otherwise still performing the other steps of the preferred methods described in detail herein. Booting from a removable storage medium clearly is not a necessary element of the invention in its broadest scope.

Moreover, it will be recognized that preferred methods and preferred configurations of the present invention overlap to various extents and, accordingly, are not mutually exclusive. Thus, for instance, examples of the first preferred method of the present invention may represent and/or incorporate therein, as well, examples of second, third, and sixth preferred methods of the present invention.

What is claimed is:

1. A method for protecting against a computer operation from being automatically performed without first confirming a user's intention for performance of the operation, comprising, for a specific performance of the computer operation, the steps of:
   (a) seeking confirmation of the user's intention that the specific performance of the operation occur; and
   (b) initiating the specific performance of the computer operation after a user's intention that the specific performance of the operation occur is confirmed;
   (c) wherein the user's intention that the specific performance of the operation occur is confirmed by a physical act of the user without requiring the use of a user-input device, the physical act of the user itself representing the confirmation of the user's intention that the specific performance of the operation occur;
   (d) wherein the physical act of the user is performed when confirmation of the user's intention that the specific performance of the operation occur is sought in said step (a), and
   (e) wherein the physical act of the user comprises replacing, within a computer configuration, a first removable storage medium after a program thereon has been read with a second removable storage medium, the program including computer-executable instructions for determining the presence within the computer configuration of the second removable storage medium in place of the first removable storage medium.

2. A method for confirming, without requiring use of a user-input device of a computer, a users intention to perform a computer operation, comprising, for each specific performance of a plurality of performances of the computer operation, the steps of:
   (a) prior to initiating the specific performance of the computer operation, seeking confirmation of the user's intention that the specific performance of the operation occur by,
      (i) reading and running a program stored on a first removable storage medium within a computer configuration;
      (ii) in accordance with the program, determining in a check the presence within the computer configuration of a second removable storage medium in place of the first removable storage medium; and
      (iii) initiating the computer operation after the check indicates the presence within the computer configuration of the second removable storage medium in place of the first removable storage medium;
   (b) wherein a physical act of substituting the first removable storage medium with the second removable storage medium itself represents the confirmation of the user's intention that the specific performance of the operation occur; and
   (c) wherein said determining in the check of step (a)(ii) does not require input from a user-input device.

3. A computer-readable medium having computer-executable instructions for performing steps of the method of claim 2.

4. The method of claim 1 or 2, wherein the computer configuration includes hardware for accessing the first and second removable storage media.

5. The method of claim 2, further comprising the step of repeating said step of determining in a check the presence within the computer configuration of the second removable storage medium until said step results in the successful determination of the second removable storage medium within the computer configuration in place of the first removable storage medium or until either (i) a predetermined number of attempts has occurred and/or (ii) a predetermined time period has expired.

6. The method of claim 4, wherein the hardware is capable of accessing only singly a particular type of removable storage media, the first and second removable storage media comprising part of said type.

7. The method of claim 4, wherein the hardware is capable of accessing concurrently the first and second removable storage media.

8. In a computer configuration including hardware capable of accessing only singly a particular type of removable storage media, a method for confirming, without requiring use of a user-input device of a computer, a user's intention to perform a computer operation, comprising, for each specific performance of a plurality of performances of the computer operation, the steps of:
   (a) prior to initiating the specific performance of the computer operation, seeking confirmation of the user's intention that the specific performance of the operation occur by,
      (i) reading and running a program stored on a first removable storage medium of said type within the computer configuration using the hardware;
      (ii) in accordance with the program, accessing a second removable storage medium of said type using the hardware; and
      (iii) initiating the operation after the second removable storage medium is successfully accessed using the hardware in accordance with the program;

(b) wherein a physical act of substituting the first removable storage medium with the second removable storage medium itself represents the confirmation of the user's intention that the specific performance of the operation occur, and (c) wherein said accessing the first removable storage medium of the particular type using the hardware in conjunction with accessing the second removable storage medium of the particular type using the hardware does not require input from a user-input device.

9. The method of claim 8, wherein the computer configuration further includes computer-readable media having computer-executable instructions for performing the steps of the method.

10. The method of claim 1, 2, or 8, wherein the first removable storage medium is a bootstrap medium.

11. The method of claim 1, 2, or 8, wherein the operation is performed on a computer.

12. The method of claim 1, 2, or 8, wherein the first removable storage medium includes a bootstrap program.

13. The method of claim 1, 2, or 8, wherein the first and second removable storage media comprise one of the type of floppy disks, ZIP disks, optical disks, CD-ROM disks, DVD disks, USB-devices, serial devices, parallel devices, SCSI devices, infrared capable devices, wireless devices, short-range radio frequency (RF) enabled devices, smart cards, and magnetic stripe cards.

14. The method of claim 1, 2, or 8, wherein the computer configuration includes a computer that has no user-input devices connected thereto.

15. The method of claim 1, 2, or 8, wherein the computer configuration includes a computer that has a user-input device that is disabled or malfunctioning.

16. The method of claim 1, 2, or 8, wherein the computer configuration includes a computer comprising a laptop computer.

17. The method of claim 1, 2, or 8, wherein the computer configuration includes a computer that has no user-output devices connected thereto.

18. The method of claim 1, 2, or 8, wherein the computer configuration includes a computer comprising a headless server.

19. The method of claim 1, 2, or 8, wherein the computer configuration comprises a first node of a computer network and including a computer on which the operation is performed.

20. The method of claim 2 or 8, further comprising waiting a predetermined period prior to said step of determining in a check the presence within the computer configuration of the second removable storage medium.

21. The method of claim 8, further comprising the step of repeating said step of accessing the second removable storage medium using the hardware until said step results in the successful access of the second removable storage medium using the hardware or until either (i) a predetermined number of attempts has occurred and/or (ii) a predetermined time period has expired.

22. The method of claim 12, wherein the bootstrap program instructs the computer to run the first program stored on the first removable storage medium.

23. The method of claim 12, wherein the first program comprises the bootstrap program.

24. The method of claim 19, wherein the first removable storage medium is replaced with the second removable storage medium at a second, different node of the computer network.

25. The method of claim 19, wherein a computer-readable medium having computer-executable instructions for performing the operation is located at a second, different node of the computer network.

26. The method of claim 25, wherein the second node comprises a network attached storage device.

27. A first removable storage medium readable by a computer and having computer-executable instructions for performing a method for initiating a computer operation after a users intention to perform the operation is confirmed without requiring use of a user-input device of a computer, the method comprising the steps of:

(a) determining in a check the presence within the computer configuration of a second removable storage medium that has been substituted for the first removable storage medium; and (b) initiating the operation only after the check indicates the presence of the second removable storage medium in place of the first removable storage medium;

(c) wherein a physical act of substituting the first removable storage medium with the second removable storage medium itself represents the confirmation of the user's intention that the operation occur; and (d) wherein said determining in the check of step (a) does not require input from a user-input device.

28. The first removable storage medium of claim 27, wherein the first removable storage medium is a bootstrap medium.

29. The first removable storage medium of claim 27, further comprising computer-executable instructions on the first removable storage medium for waiting a predetermined period prior to said step of determining in a check the presence within the computer configuration of the second removable storage medium.

30. The first removable storage medium of claim 27, further comprising computer-executable instructions on the first removable storage medium for repeating said step of determining in a check the presence within the computer configuration of the second removable storage medium until said step results in the successful determination of the second removable storage medium within the computer configuration in place of the first removable storage medium or until either (i) a predetermined number of attempts has occurred and/or (ii) a predetermined time period has expired.

31. The first removable storage medium of claim 28, wherein the computer-executable instructions are part of a bootstrap program.

32. The first removable storage medium of claim 28, wherein the computer-executable instructions are part of a program which the bootstrap program instructs the computer to run.

* * * * *